US012678734B2

(12) United States Patent
Aoshima et al.

(10) Patent No.: US 12,678,734 B2
(45) Date of Patent: ***Jul. 14, 2026

(54) CARBON DIOXIDE RECOVERY SYSTEM

(71) Applicant: DENSO CORPORATION, Kariya-city (JP)

(72) Inventors: Hiroki Aoshima, Kariya-city (JP); Yousuke Nakamura, Kariya-city (JP); Hiroyuki Takikawa, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 445 days.

This patent is subject to a terminal disclaimer.

(21) Appl. No.: 18/341,109

(22) Filed: Jun. 26, 2023

(65) Prior Publication Data

US 2024/0001294 A1     Jan. 4, 2024

(30) Foreign Application Priority Data

Jun. 29, 2022     (JP) ................................. 2022-105082

(51) Int. Cl.
*B01D 53/32* (2006.01)
*B01D 53/04* (2006.01)
(Continued)

(52) U.S. Cl.
CPC ....... *B01D 53/326* (2013.01); *B01D 53/0407* (2013.01); *B01D 53/346* (2013.01);
(Continued)

(58) Field of Classification Search
CPC ..... B01D 53/965; B01D 53/326; B01D 53/62
See application file for complete search history.

(56) References Cited

U.S. PATENT DOCUMENTS

2017/0113182 A1*   4/2017   Voskian ............... B01D 53/326
2018/0257027 A1    9/2018   Desai et al.
(Continued)

FOREIGN PATENT DOCUMENTS

JP     2022-008288 A     1/2022
WO     2017/075014 A1    5/2017

OTHER PUBLICATIONS

Hatton et al, "Faradaic electro-swing reactive adsorption for CO2 capture" Energy & Environmental Science, 2019, 12, 3530-3547. (Year: 2019).*

(Continued)

*Primary Examiner* — Brian W Cohen
(74) *Attorney, Agent, or Firm* — Posz Law Group, PLC

(57) ABSTRACT

In an adsorption mode, a control device applies an adsorption potential between a working electrode and a counter electrode only during an adsorption time. The adsorption time corresponds to a target carbon dioxide adsorption amount, which an adsorbent can adsorb. In a desorption mode, the control device applies a desorption potential only during a recovery time corresponding to a recovery amount. At this time, the control device acquires an optimum desorption time which is a desorption time associated with a carbon dioxide desorption amount equivalent to a target carbon dioxide recovery amount RVCO2 in a desorption amount change map data. Then, the control device applies the desorption potential only during the optimum desorption time in the desorption mode.

7 Claims, 12 Drawing Sheets

(51) Int. Cl.
    *B01D 53/34*           (2006.01)
    *B01D 53/62*           (2006.01)

(52) U.S. Cl.
    CPC ........ *B01D 53/62* (2013.01); *B01D 2253/202*
          (2013.01); *B01D 2257/504* (2013.01); *B01D*
          *2259/40083* (2013.01); *B01D 2259/818*
          (2013.01)

(56)               References Cited

U.S. PATENT DOCUMENTS

| | | |
|---|---|---|
| 2022/0387930 A1 | 12/2022 | Iijima et al. |
| 2023/0338893 A1 | 10/2023 | Aoshima et al. |

OTHER PUBLICATIONS

U.S. Appl. No. 18/347,996, filed Jul. 6, 2023, Aoshima et al.
U.S. Appl. No. 18/359,146, filed Jul. 26, 2023, Aoshima et al.

* cited by examiner

TGCO2 SET PROCESS

S400 — IS RECOVERY AMOUNT WITHIN ADHRG?

NO

YES

S410 — HOLD TGCO2

S420 — UPDATE TGCO2

S430 — SET TGCO2

END

MAP CREATION PROCESS

S500 — MAP CREATION DETERMINATION CONDITION SATISFIED?

NO

S530 — RETRY

YES

S510 — CALCULATE SLOPE

S520 — CALCULATE DECO2T

END

```
      ╭──────────────────────╮
      │  DESORPTION TIME     │
      │  UPDATE PROCESS      │
      ╰──────────────────────╯
                 │
                 ▼
S600 ──┌──────────────────────┐
       │   CALCULATE DECO2T   │
       └──────────────────────┘
                 │
                 ▼
S610 ──┌──────────────────────┐
       │      FIX DECO2T      │
       └──────────────────────┘
                 │
                 ▼
       ╭──────────────────────╮
       │         END          │
       ╰──────────────────────╯
```

CARBON DIOXIDE RECOVERY SYSTEM

CROSS REFERENCE TO RELATED APPLICATIONS

The present application is based on and claims the benefit of priority from Japanese Patent Application No. 2022-105082 filed in Japan filed on Jun. 29, 2022, the entire disclosure of the above application is incorporated herein by reference.

TECHNICAL FIELD

The present disclosure relates to a carbon dioxide recovery system that recovers carbon dioxide from a mixed gas containing carbon dioxide.

BACKGROUND

In the carbon dioxide recovery system, it may be difficult to observe a release state (desorption state) of the carbon dioxide with a sensor or the like. In this case, the carbon dioxide recovery system cannot work for an optimum desorption time period. Therefore, in the carbon dioxide recovery system, the electrochemical cell for desorbing carbon dioxide needs to be energized for a long time, which may increase energy consumption. In the above aspects, or in other aspects not mentioned, there is a need for further improvements in a carbon dioxide recovery system.

SUMMARY

In order to achieve the above objectives, a carbon dioxide recovery system according to the present disclosure is a carbon dioxide recovery system for recovering carbon dioxide from a mixed gas containing carbon dioxide by an electrochemical reaction, the system comprising:

a carbon dioxide recovery tank which stores recovered carbon dioxide, at least one collector device which has an electrochemical cell and a container, the electrochemical cell having a working electrode containing an adsorbent capable of adsorbing carbon dioxide and a counter electrode paired with the working electrode, the container containing the electrochemical cell and being supplied with a mixed gas;

a sensor which detects a recovery amount of carbon dioxide recovered from the collector device to the carbon dioxide recovery tank;

a control device which is configured to acquire a correlation value correlated with a recovery amount, which is a detection result through the sensor, and control (i) an application of a first potential between the working electrode and the counter electrode only during an adsorption time corresponding to a target adsorption amount which is an adsorption amount of carbon dioxide that the adsorbent can adsorb so that the adsorbent adsorbs carbon dioxide when executing an adsorption mode in which carbon dioxide is adsorbed, or (ii) an application of a second potential between the working electrode and the counter electrode only during a recovery time corresponding to the recovery amount when executing a desorption mode in which the carbon dioxide adsorbed in the adsorbent is desorbed; and a storage unit which stores desorption amount change data in which a desorption amount of carbon dioxide and a desorption time for obtaining the desorption amount are associated, wherein the control device is configured to acquire a desorption time, as an optimum desorption time, associated with a desorption amount equivalent to a recovery amount or a target adsorption amount in the desorption amount change data, and to apply a second potential only during the optimum desorption time in a desorption mode.

In a carbon dioxide recovery system, a recovery amount, an adsorption amount and a desorption amount may be considered equivalent. Therefore, the carbon dioxide recovery system according to the present disclosure, as described above, acquires the desorption time as the optimum desorption time. The desorption time is associated with the desorption amount equivalent to the recovery amount or the target adsorption amount in the desorption amount change data. Then, the carbon dioxide recovery system applies the second potential only during the optimum desorption time in the desorption mode. Therefore, in the carbon dioxide recovery system, it is possible to suppress energy consumption by optimizing a apply time of the second potential in the desorption mode.

Technical features described in "Claims" and other features are come apparent from the description of the embodiments and the accompanying drawings.

BRIEF DESCRIPTION OF DRAWINGS

FIG. 1 is a diagram showing a configuration of a carbon dioxide recovery system according to an embodiment.

FIG. 3 is a time chart showing operation of each unit when the process shown in the flowchart of FIG. 2 is performed.

DETAILED DESCRIPTION

Figure 2:
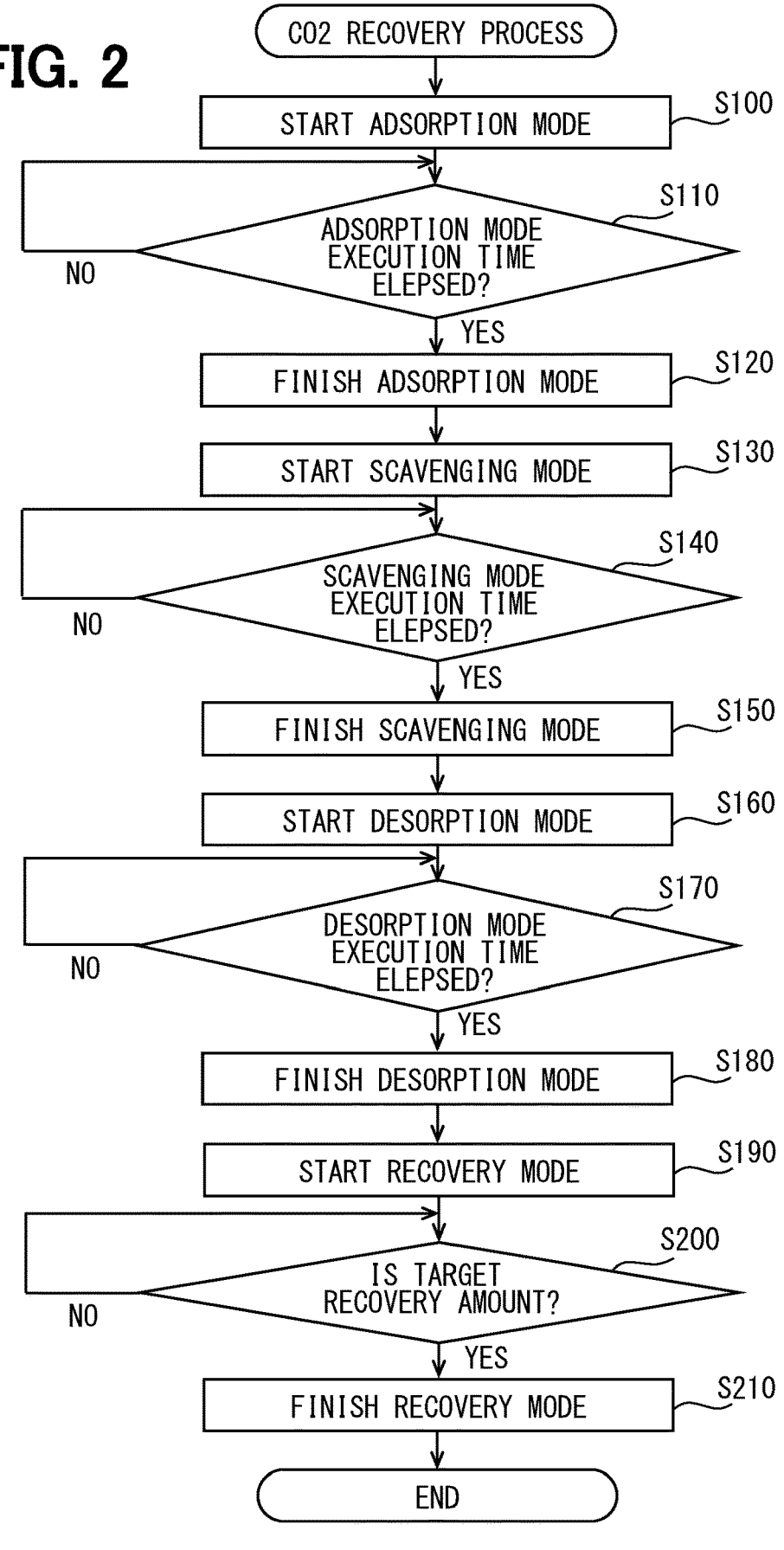
FIG. 2 is a flowchart showing a process in a control device to perform a series of control sequences for carbon dioxide recovery.

JP2018-533470A proposes a gas separation system that separates carbon dioxide from a mixed gas containing carbon dioxide by an electrochemical reaction. In this gas separation system, the mixed gas containing carbon dioxide is introduced into a housing in which an electrochemical cell is disposed. In a charge mode in which electrons are directed to the negative electrode of the electrochemical cell, an electroactive material provided on the negative electrode is reduced. Therefore, the electroactive material on the negative electrode is bonded to the carbon dioxide, and the carbon dioxide is separated from the mixed gas. On the other hand, in a discharge mode in which an electron flow is generated in a direction opposite to that in the charge mode, the electroactive material on the negative electrode is oxidized. As a result, the carbon dioxide is released from the electroactive material on the negative electrode.

By the way, in the carbon dioxide recovery system, it may be difficult to observe a release state (desorption state) of the carbon dioxide with a sensor or the like. In this case, the carbon dioxide recovery system cannot work for an optimum desorption time period. Therefore, in the carbon dioxide recovery system, the electrochemical cell for desorbing carbon dioxide needs to be energized for a long time, which may increase energy consumption.

It is an object of the present disclosure to provide a carbon dioxide recovery system capable of suppressing energy consumption.

Figure 1:
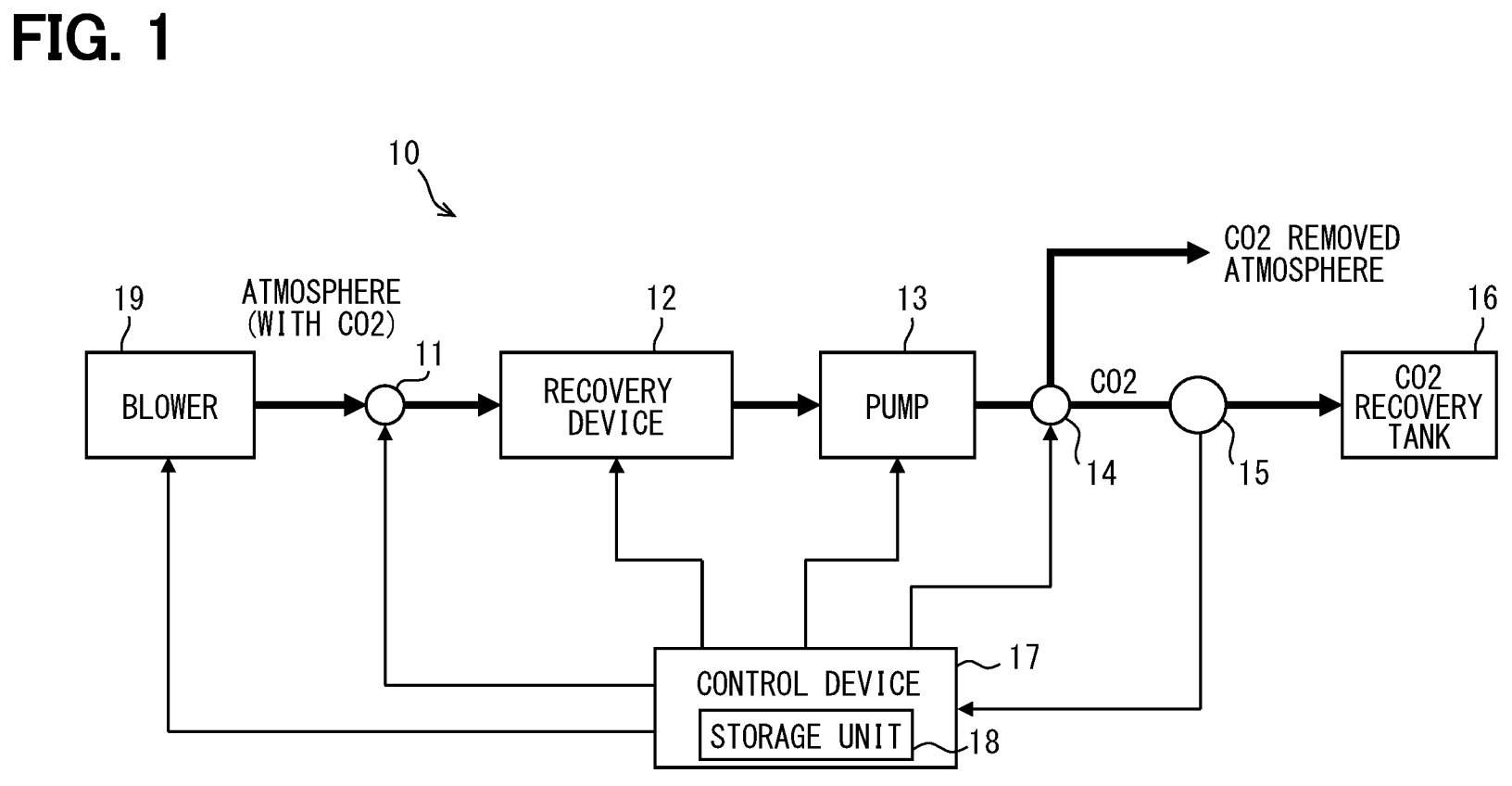

Hereinafter, a carbon dioxide recovery system according to an embodiment of the present disclosure will be described in detail with reference to the drawings. In the drawings, the same or equivalent portions are denoted by the same reference numerals. The carbon dioxide recovery system according to the present embodiment recovers carbon dioxide from a mixed gas (e.g., atmospheric gas) containing carbon dioxide. The mixed gas from which the carbon dioxide has been removed is discharged to the outside (atmosphere). FIG. 1 shows a configuration of a carbon dioxide recovery system 10 according to the present embodiment.

The carbon dioxide recovery system 10 shown in FIG. 1 includes a channel on-off valve 11, a collector device 12, a pump 13, a channel switching valve 14, a sensor 15, a CO2 recovery tank 16, a control device 17, and a blower 19. In the drawings and the specification, carbon dioxide may be referred to as "CO2" or "CO2". The CO2 recovery tank 16 corresponds to a carbon dioxide recovery tank.

On-off state of the channel on-off valve 11 is controlled by the control device 17. If the channel on-off valve 11 is opened, a mixed gas containing carbon dioxide can be introduced into the collector device 12 through a channel pipe communicating the outside (atmosphere) and the inside of the collector device 12. On the other hand, if the channel on-off valve 11 is closed, the channel pipe communicating the outside and the inside of the collector device 12 is blocked, and the collector device 12 is sealed from the outside.

The blower 19 is activated by the control device 17 when the channel on-off valve 11 is opened, and sends the mixed gas containing carbon dioxide into the collector device 12 through the channel pipe communicating the outside and the inside of the collector device 12. However, the blower 19 may be omitted. Alternatively, the pump 13 may also serve as the blower 19. That is, if the channel on-off valve 11 is opened, the pump 13 may be activated such that the mixed gas containing carbon dioxide is drawn into the collector device 12 from the outside through the channel pipe.

The collector device 12 includes an electrochemical cell disposed inside a housing made of, for example, a metal. The electrochemical cell can adsorb carbon dioxide by an electrochemical reaction to separate the carbon dioxide from the mixed gas, and desorb the adsorbed carbon dioxide to accumulate the desorbed carbon dioxide in the CO2 recovery tank 16 by the pump 13. The collector device 12 has two openings. One of the openings is an introduction port for introducing the mixed gas containing carbon dioxide into the housing of the collector device 12 from the outside. The other of the openings is a discharge port for discharging the mixed gas from which the carbon dioxide has been removed or the carbon dioxide desorbed from the electrochemical cell. The above channel pipe communicating the outside and the inside of the collector device 12 is connected to the introduction port, and a channel pipe provided with the pump 13 is connected to the discharge port. Note that the inside of the collector device 12 is the same as the inside of the housing.

A plurality of electrochemical cells are stacked and disposed in the housing of the collector device 12. The stacking direction of the plurality of electrochemical cells is a direction orthogonal to the flow direction of the mixed gas. Each electrochemical cell is formed in a plate shape, and is disposed such that a plate surface intersects with the stacking direction of the cells. A predetermined gap is provided between the adjacent electrochemical cells. The gap provided between the adjacent electrochemical cells serves as a gas channel through which the mixed gas flows.

Each electrochemical cell is configured by stacking, for example, a working electrode current collecting layer, a working electrode, a separator, a counter electrode, a counter electrode current collecting layer, and the like in the described order. The working electrode is a negative electrode, and the counter electrode paired with the working electrode is a positive electrode. By changing a potential difference to be applied between the working electrode and the counter electrode, electrons can be provided to the working electrode so that a carbon dioxide adsorbent of the working electrode is caused to adsorb carbon dioxide, or electrons can be released from the working electrode so that the carbon dioxide adsorbent is caused to desorb the adsorbed carbon dioxide. The carbon dioxide adsorbent corresponds to an adsorbent.

The working electrode current collecting layer is made of a porous conductive material having pores through which the mixed gas containing carbon dioxide can pass. The working electrode current collecting layer only needs to have gas permeability and conductivity, and as a material for forming the working electrode current collecting layer, for example, a metal material or a carbonaceous material can be used.

The working electrode is formed of a material obtained by mixing the carbon dioxide adsorbent, a conductive substance, a binder, and the like. The carbon dioxide adsorbent has a property of adsorbing carbon dioxide by receiving electrons and desorbing the adsorbed carbon dioxide by releasing electrons. As the carbon dioxide adsorbent, for example, polyanthraquinone can be used. The conductive substance forms a conductive path to the carbon dioxide adsorbent. As the conductive substance, for example, a carbon material, such as a carbon nanotube, carbon black, or graphene, can be used. The binder is for holding the carbon dioxide adsorbent and the conductive substance. As the binder, for example, a conductive resin can be used. The conductive resin may be, for example, an epoxy resin or a fluoropolymer, containing Ag or the like as a conductive filler. The fluoropolymer may be, for example, polytetrafluoroethylene (PTFE), or polyvinylidene fluoride (PVDF).

The counter electrode is formed of a material obtained by mixing an electroactive auxiliary material, a conductive substance, a binder, and the like. Since the conductive substance and the binder of the counter electrode are similar to the conductive substance and the binder of the working electrode, description thereof is omitted. The electroactive auxiliary material of the counter electrode is made of a material having an active substance serving as an electron donor. The electroactive auxiliary material of the counter electrode is an auxiliary electroactive species that exchanges electrons with the carbon dioxide adsorbent of the working electrode. As the electroactive auxiliary material, for example, a metal complex capable of exchanging electrons by changing the valence of a metal ion can be used. Examples of such metal complex include cyclopentadienyl metal complexes such as ferrocene, nickelocene and cobaltocene, and porphyrin metal complexes. Each of these metal complexes may be a polymer or a monomer. Similarly to the working electrode current collecting layer, the counter electrode current collecting layer is formed of a conductive material such as a metal material or a carbonaceous material.

The separator is disposed between the working electrode and the counter electrode to separate the working electrode and the counter electrode. The separator is an insulating ion permeable membrane that prevents physical contact between the working electrode and the counter electrode to suppress an electrical short circuit, and causes ions to pass therethrough. As the separator, a cellulose membrane, a polymer, a composite material of a polymer and a ceramic, or the like can be used.

In the electrochemical cell, an electrolyte is provided across the working electrode and the counter electrode. As the electrolyte, for example, an ionic liquid can be used. The ionic liquid is a salt of a liquid having non-volatility under normal temperature and pressure.

The pump 13 may suck a residual mixed gas left in the collector device 12 from the collector device 12 and discharge the mixed gas to the outside (i.e., scavenges the residual mixed gas in the collector device 12). And, if the carbon dioxide adsorbed by the carbon dioxide adsorbent is desorbed, the pump 13 may suck the desorbed carbon dioxide from the collector device 12 and discharge the carbon dioxide toward the CO2 recovery tank 16. If the pump 13 scavenges the residual mixed gas in the collector device 12, the channel on-off valve 11 blocks the channel pipe communicating the outside and the inside of the collector device 12. Therefore, the scavenging of the residual mixed gas in the collector device 12 is performed by evacuation by the pump 13. In addition, the subsequent discharge (recovery) of the carbon dioxide to the CO2 recovery tank 16 is also performed in a state closer to a vacuum than the atmosphere.

The channel switching valve 14 is a three-way valve that switches the channel for a gas flowing through the pipe on the downstream side of the pump 13. Switching the channel of the channel switching valve 14 is controlled by the control device 17. Specifically, if the mixed gas containing carbon dioxide is introduced into the collector device 12 or if the residual mixed gas in the collector device 12 is scavenged by the pump 13, the control device 17 controls the channel switching valve 14 such that the pipe on the downstream side of the pump 13 communicates with the outside (atmosphere). As a result, the mixed gas from which the carbon dioxide has been removed and the residual mixed gas in the collector device 12 are released to the outside. On the other hand, if the pump 13 sucks the desorbed carbon dioxide from the collector device 12 and discharges the carbon dioxide in a state where the carbon dioxide adsorbent desorbs the adsorbed carbon dioxide, the control device 17 controls the channel on-off valve 11 such that the pipe on the downstream side of the pump 13 communicates with a side to the CO2 recovery tank 16. As a result, the carbon dioxide recovered by the collector device 12 can be accumulated in the CO2 recovery tank 16.

The sensor 15 detects a carbon dioxide concentration and a flow rate of the gas flowing through the pipe connected to the CO2 recovery tank 16 at predetermined time intervals. The control device 17 may calculate (detect), from the carbon dioxide concentration and the flow rate detected by the sensor 15, a carbon dioxide recovery amount RVCO2 recovered in the CO2 recovery tank 16. This carbon dioxide recovery amount RVCO2 corresponds to a detection result through the sensor. The carbon dioxide recovery amount RVCO2 may be calculated by the sensor 15. In this case, the sensor 15 outputs the carbon dioxide recovery amount RVCO2 to the control device 17. The carbon dioxide recovery amount RVCO2 may also be referred to as a carbon dioxide monitor value. The carbon dioxide recovery amount RVCO2 corresponds to a recovery amount. The carbon dioxide recovery amount RVCO2 detected via the sensor 15 may also be referred to be a monitor value.

Figure 5:
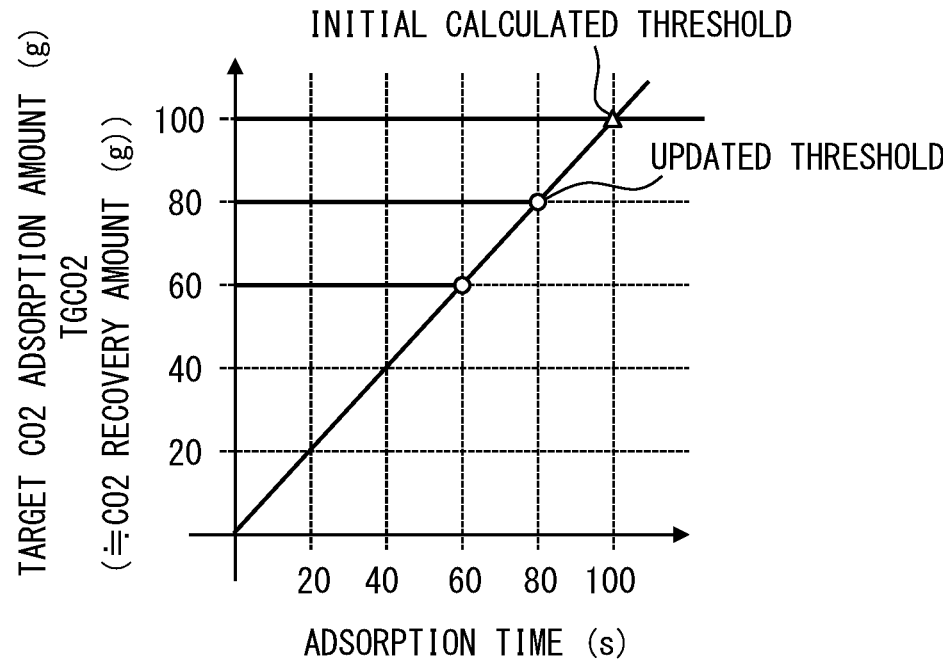
FIG. 5 is a graph showing an example of adsorption amount change map data.
Figure 6:
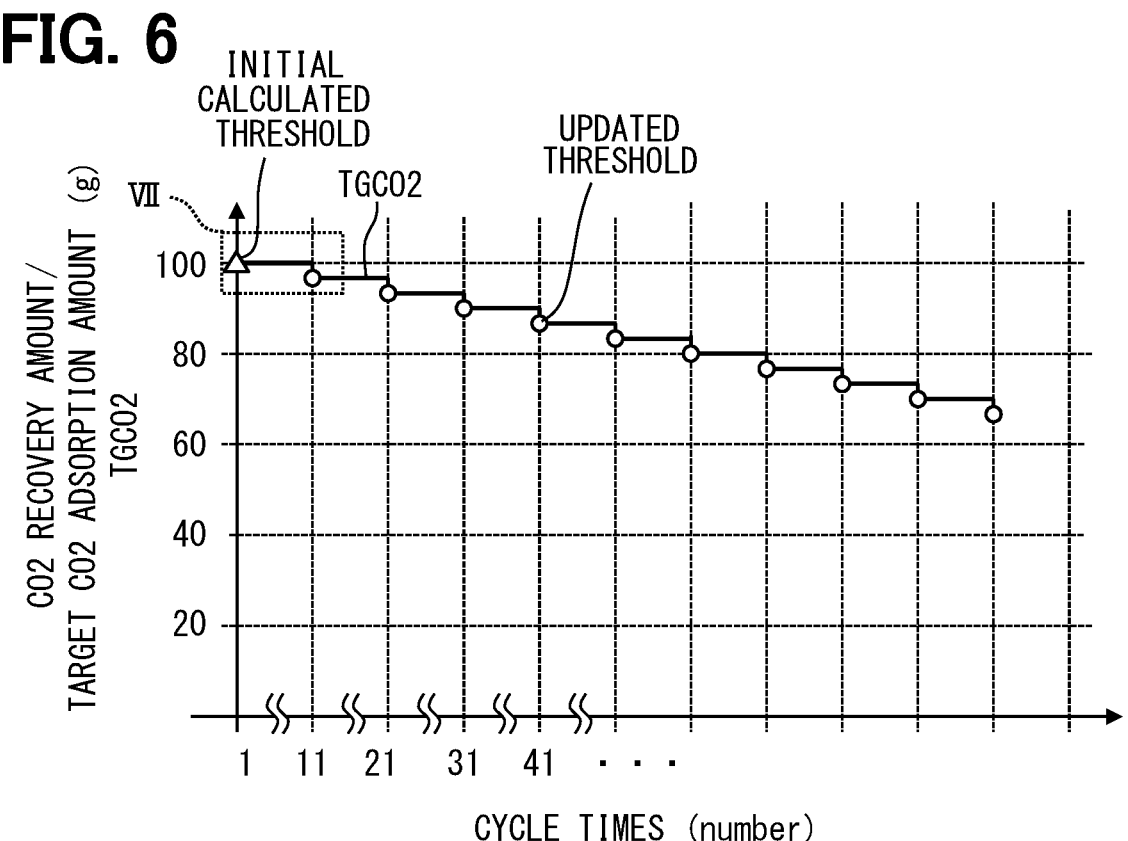
FIG. 6 is a graph showing an example of recovery amount change map data.
Figure 7:
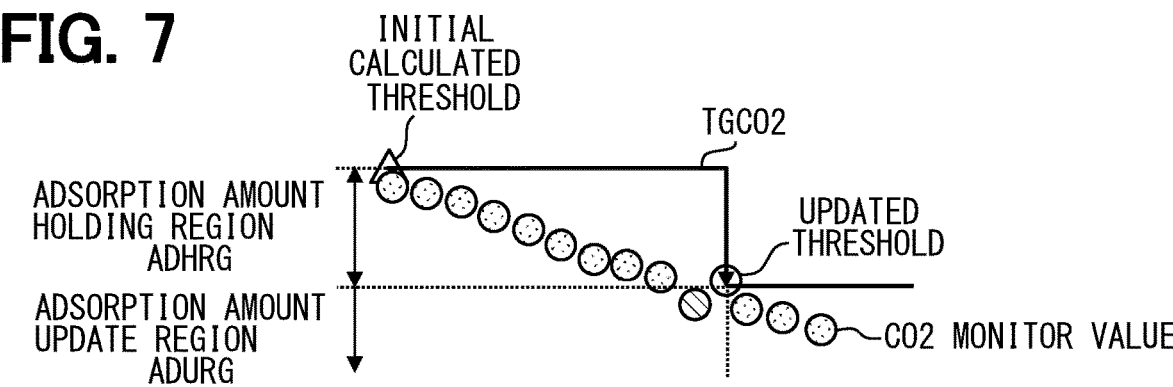
FIG. 7 is an enlarged graph of a part VII in FIG. 6.

The control device 17 includes a well-known microcontroller including a central processing unit (i.e., CPU), a read only memory (i.e., ROM), a random access memory (i.e., RAM) and the like, and peripheral devices thereof. The peripheral devices include a storage unit 18 having a storage medium. The storage unit 18 stores adsorption amount change map data and recovery amount change map data. The adsorption amount change map data corresponds to the adsorption amount change data. The recovery amount change map data corresponds to the recovery amount change data. In the adsorption amount change map data, an adsorption time is associated with a target carbon dioxide adsorption amount TGCO2, as shown in FIG. 5. In the recovery amount change map data, a change in the carbon dioxide recovery amount RVCO2 is associated with the target carbon dioxide adsorption amount TGCO2, as shown in FIGS. 6 and 7. The target carbon dioxide adsorption amount is also referred to as a maximum adsorption amount. The adsorption time is also referred to as an adsorption mode execution time. The adsorption amount change map data and the recovery amount change map data will be described in detail later. This system or device has an electronic controller. The controller has at least one processor circuit. One example of a processor circuit is a processor circuit that executes a program which is an assembled instructions executable by a computer. The processor circuit may be so-called a microprocessor and may be provided as a chip. The controller includes a program and a non-transitory, tangible storage medium, e.g., a semi-conductor memory, for recording data. The processor circuit provides functions of the device according to this disclosure by executing a program. Another example of a processor circuit is a processor circuit including a plurality of logic circuits or analog circuits. A plurality of logic circuits or analog circuits are configured to provide a plurality of substantive elements and their electrical connections so as to provide functions of the apparatus according to this disclosure. The processor circuit may have various names such as accelerators, gate arrays, and FPGAs (Field-programmable gate arrays). The controller is also called a microcontroller or a microcomputer. The controller, having at least one processor circuit, is configured to perform as at least one unit, module, or section described in this disclosure.

Figure 15:
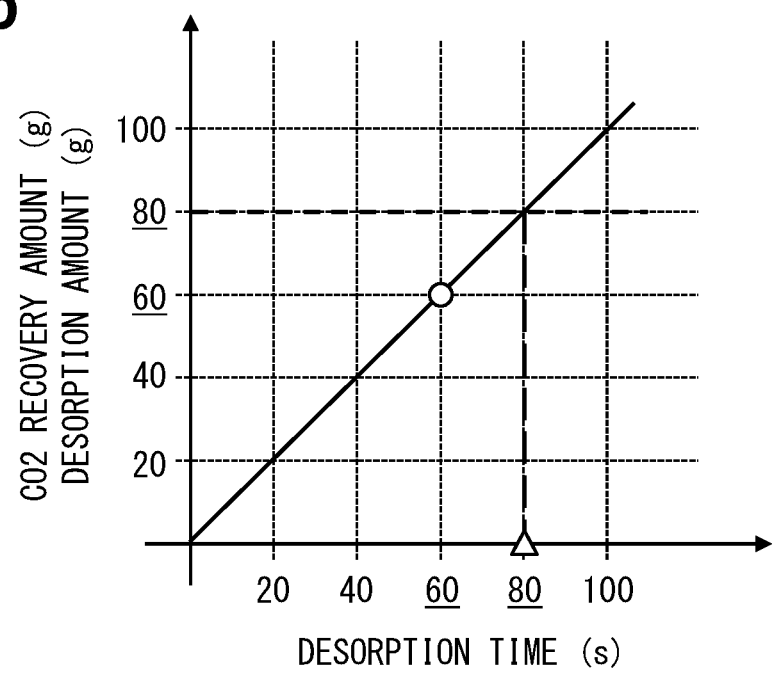
FIG. 15 is a diagram showing desorption amount change map data.

Further, the storage unit 18 stores desorption amount change map data. The desorption amount change map data corresponds to the desorption amount change data. As shown in FIG. 15, the desorption amount change map data is associated with the desorption amount of carbon dioxide and the desorption time for obtaining the desorption amount of carbon dioxide. Also, the carbon dioxide desorption amount can be regarded as equivalent to a carbon dioxide recovery amount RVCO2 and a target carbon dioxide adsorption amount. Therefore, it can be said that the desorption amount change map data associates the carbon dioxide recovery amount RVCO2 or the target carbon dioxide adsorption amount with the desorption time.

The control device 17 performs various arithmetic processing on the basis of a control program stored in the storage medium such as a ROM, and controls operations of various control target devices such as the channel on-off valve 11, the collector device 12, the pump 13, the channel switching valve 14, and the blower 19. The control device 17 of the present embodiment controls the operations of the various control target devices such that, in the carbon dioxide recovery system 10, a series of control sequences for carbon dioxide recovery, including at least an adsorption mode, a desorption mode, and a recovery mode, is executed. Note that the control sequences may include a scavenging mode in addition to the above.

Figure 3:
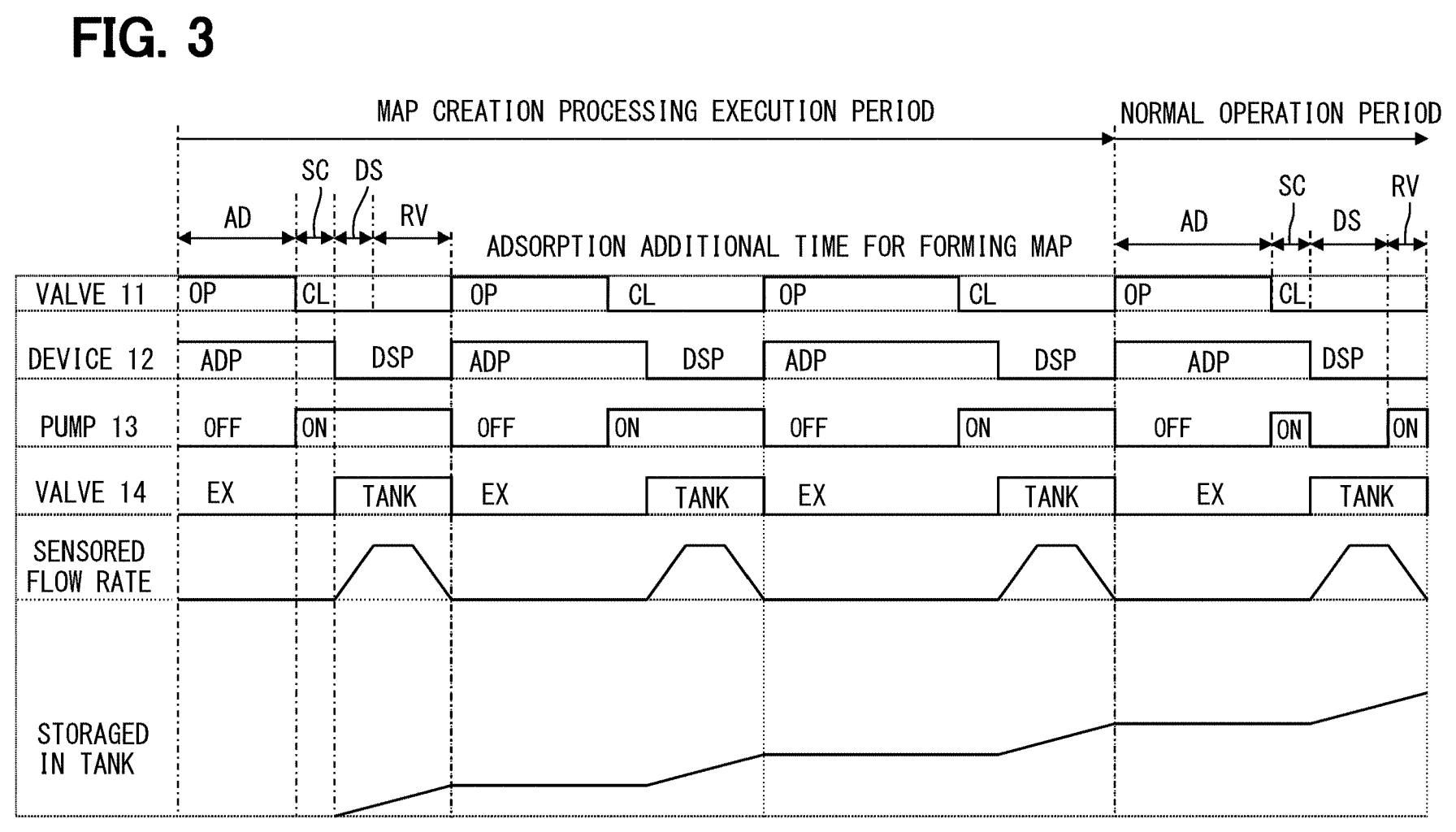
Figure 4:
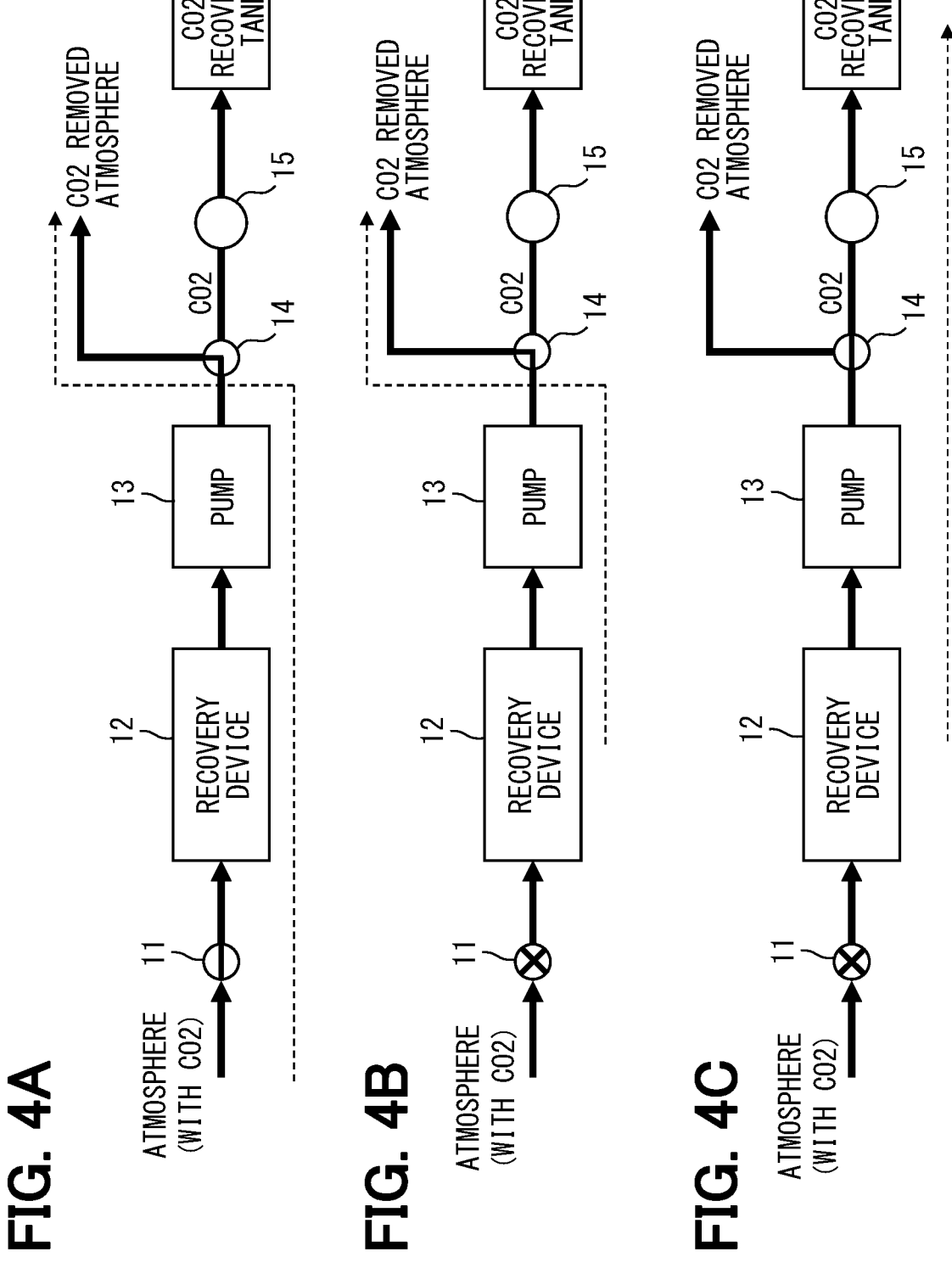
FIG. 4A is an explanatory diagram for explaining an adsorption mode included in the series of control sequences.
FIG. 4B is an explanatory diagram for explaining a scavenging mode included in the series of control sequences.
FIG. 4C is an explanatory diagram for explaining a recovery mode included in the series of control sequences.

Hereinafter, the series of control sequences for carbon dioxide recovery, including at least an adsorption mode, a scavenging mode, and a desorption mode, and a recovery mode, that is executed in the carbon dioxide recovery system 10 is described. FIG. 2 is a flowchart showing a process performed in the control device 17 to execute the control sequences. FIG. 3 is a timing diagram showing operation of each unit when the process shown in the flowchart of FIG. 2 is performed. In the drawing, the followings symbols are used: "AD" for the adsorption mode, "SC" for the scavenging mode, "DS" for the desorption mode, "RV" for the recovery mode, "OP" for open, "CL" for close, "ADP" for the adsorption potential, "DSP" for the desorption potential, "EX" for a direction to an outside, and "TANK" for a direction to the CO2 recovery tank 16. FIG. 4 An FIG. 4B, and FIG. 4C are explanatory diagrams for explaining an adsorption mode, a scavenging mode, a desorption mode and a recovery mode included in the series of control sequences.

Further, the control device 17 executes the adsorption mode, the scavenging mode, the desorption mode, and the recovery mode during the map creation process execution period and the normal operation period. However, the control device 17 performs different controls in each mode between the map creation processing execution period and the normal operation period. For example, an adsorption mode execution time and a desorption mode execution time are different.

As shown in the flowchart of FIG. 2, the control device 17 first starts, in a step S100, the adsorption mode which is a first operation mode of the series of control sequences. In this adsorption mode, the channel on-off valve 11 is opened such that the mixed gas containing carbon dioxide can be introduced into the collector device 12, as shown in FIG. 3. In a case where the blower 19 is provided, the blower 19 is activated such that more mixed gas is introduced into the collector device 12. In a case where the pump 13 also serves as the blower 19, the pump 13 is activated to suck the mixed gas, so that the mixed gas is drawn into the collector device 12 from the outside. In this case, the pump 13 is activated only to suck the mixed gas from the outside, so that the energy required for the suction is less than that required for activating the pump for the evacuation in the scavenging mode, the desorption mode, or the recovery mode to be described later.

In the adsorption mode, an adsorption potential (corresponding to a first potential), at which the carbon dioxide adsorbent of the working electrode can adsorb carbon dioxide, is applied between the working electrode and the counter electrode of the electrochemical cell of the collector device 12, as shown in FIG. 3. Furthermore, in the adsorption mode, the channel switching valve 14 is controlled such that the pipe on the downstream side of the pump 13 communicates with the outside, as shown in FIG. 3.

By such control of the channel on-off valve 11, the electrochemical cell of the collector device 12, the channel switching valve 14, and the like, the mixed gas (atmospheric gas) containing carbon dioxide passes through the channel on-off valve 11 and enters the collector device 12 in the adsorption mode, as shown by a dotted arrow in FIG. 4A. The mixed gas having entered the collector device 12 have the carbon dioxide adsorbed by the plurality of electrochemical cells, whereby the carbon dioxide is removed from the mixed gas. The mixed gas, from which the carbon dioxide has been removed, passes through the pump 13, is guided to a channel pipe leading toward the outside at the channel switching valve 14, and is discharged to the outside through the channel pipe.

In a step S110 in the flowchart of FIG. 2, the control device 17 determines whether the adsorption mode execution time has elapsed. The adsorption mode execution time is not constant but changes for the reasons: for estimating, in the later-described map creation process, a maximum adsorption amount of the electrochemical cell and a maximum adsorption amount time that is the adsorption mode execution time to obtain the maximum adsorption amount; for optimizing the carbon dioxide recovery amount RVCO2 and consumed energy if the carbon dioxide adsorption performance of the electrochemical cell changes due to environmental changes or deterioration over time; and for others. This changing adsorption mode execution time is set by the control device 17. In the step S110, it is determined whether the set adsorption mode execution time has elapsed. In the present embodiment, the maximum adsorption amount is used as the target carbon dioxide adsorption amount TGCO2. Therefore, the maximum adsorption amount is also referred to as the target carbon dioxide adsorption amount TGCO2 in the following description. The maximum adsorption amount corresponds to the target adsorption amount.

If it is determined in the determination processing in the step S110 that the set adsorption mode execution time has elapsed, the process proceeds to a step S120. On the other hand, if it is determined that the set adsorption mode execution time has not elapsed, the determination processing in the step S110 is repeatedly executed until the adsorption mode execution time elapses.

In the step S120, adsorption mode end processing is executed. Specifically, the control device 17 closes the channel on-off valve 11 to block the mixed gas that flows into the collector device 12 from the outside. If the system has the blower 19, the control device 17 stops the activation of the blower 19. The control device 17 also resets a count value of a counter that counts the adsorption mode execution time, and the like.

As described above, the control device 17 applies the adsorption potential during the execution of the adsorption mode in which the carbon dioxide is adsorbed, so that the carbon dioxide adsorbent adsorbs the carbon dioxide. The control device 17 applies the adsorption potential only during the adsorption mode execution time corresponding to the target carbon dioxide adsorption amount.

The adsorption mode execution time may be obtained from the adsorption amount change map data. The target carbon dioxide adsorption amount TGCO2 may be obtained from the recovery amount change map data. The control device 17 acquires, from the recovery amount change map data, the target carbon dioxide adsorption amount TGCO2 associated with the carbon dioxide recovery amount RVCO2 detected through the sensor 15. As shown in FIG. 7, the target carbon dioxide adsorption amount TGCO2 in the recovery amount change map data is a correlation value correlated with the carbon dioxide recovery amount RVCO2 detected through the sensor 15. Therefore, it can be said that the control device 17 acquires, as the target carbon dioxide adsorption amount TGCO2, a correlation value correlated with the carbon dioxide recovery amount RVCO2 detected through the sensor 15.

Then, the control device 17 acquires the adsorption mode execution time associated with the target carbon dioxide adsorption amount from the adsorption amount change map data. In the example of FIG. 5, if the target carbon dioxide adsorption amount is set, for example, it is set to 80 [g], the adsorption mode execution time is 80 [s].

As shown in FIG. 6, the target carbon dioxide adsorption amount is updated according to the carbon dioxide recovery amount RVCO2 detected through the sensor 15. As shown in FIG. 5, the adsorption mode execution time changes every time the target carbon dioxide adsorption amount is updated. The target carbon dioxide adsorption amount may be stored in the storage unit 18 or the like as an initial calculated threshold value or an updated threshold value.

In a step S130, the control device 17 starts the scavenging mode that is the second operation mode of the series of control sequences. In this scavenging mode, the channel on-off valve 11 remains closed, as shown in FIG. 3. The adsorption potential applied between the working electrode and the counter electrode of the electrochemical cell of the collector device 12 is maintained as it is. The communication between the pipe on the downstream side of the pump 13 and the outside by the channel switching valve 14 is also maintained.

In the scavenging mode, an activation of the pump 13 is started as shown in FIG. 3. As described above, the channel on-off valve 11 is closed, so that the collector device 12 is in a sealed state on the upstream side of the pump 13. When the pump 13 is activated in this state, the residual mixed gas left in the sealed collector device 12, from which the carbon dioxide has been removed, is sucked from the inside of the collector device 12 and discharged to the outside. As a result, the residual mixed gas in the collector device 12 can be scavenged. In the scavenging mode, the adsorption potential is applied.

Since the collector device 12 on the upstream side of the pump 13 is sealed, the scavenging of the residual mixed gas in the collector device 12 is performed by evacuation by the pump 13. Therefore, for example, in the case where the pump 13 also serves as the blower 19, the activation of the pump 13 is continued, but the activation output thereof is made higher than that in an intake mode by the start of the scavenging mode.

By such control of the channel on-off valve 11, the electrochemical cell of the collector device 12, the pump 13, and the channel switching valve 14 in the scavenging mode, the residual mixed gas in the collector device 12, from which the carbon dioxide has been removed, passes through the pump 13, is guided to the channel pipe leading toward the outside at the channel switching valve 14, and is discharged to the outside through the channel pipe, as shown by a dotted arrow in FIG. 4B.

In a step S140 in the flowchart of FIG. 2, the control device 17 determines whether a scavenging mode execution time has elapsed. The scavenging mode execution time is predetermined to a time sufficient to scavenge the residual mixed gas in the collector device 12.

If it is determined in the determination processing in the step S140 that the predetermined scavenging mode execution time has elapsed, the process proceeds to a step S150. On the other hand, if it is determined that the set scavenging mode execution time has not elapsed, the determination processing in the step S140 is repeatedly executed until the scavenging mode execution time elapses.

In the step S150, scavenging mode end processing is executed. Specifically, the control device 17 resets a count value of a counter that counts the scavenging mode execution time, and the like.

After the scavenging mode ends, the control device 17 executes the desorption mode and the recovery mode. It is also conceivable that the desorption mode and the recovery mode are performed as the same process. However, in the present disclosure, the desorption mode and the recovery mode are separately executed in order to reduce energy consumption. That is, the control device 17 does not simultaneously desorb and recover carbon dioxide, but first performs a desorption of the carbon dioxide from the electrochemical cell, and after the carbon dioxide is desorbed, performs to start a recovery of the desorbed carbon dioxide.

In a step S130, the control device 17 starts the desorption mode that is the third operation mode of the series of control sequences. In this desorption mode, the channel on-off valve 11 is maintained in a closed state, as shown in FIG. 3. On the other hand, a desorption potential (corresponding to a second potential), at which the carbon dioxide adsorbed by the carbon dioxide adsorbent of the working electrode can be desorbed by releasing electrons from the working electrode, is applied between the working electrode and the counter electrode of the electrochemical cell of the collector device 12. In the desorption mode, the channel switching valve 14 is controlled to cause the pipe on the downstream side of the pump 13 to communicate with the CO2 recovery tank 16, as shown in FIG. 3.

In addition, during the normal operation period, the activation of the pump 13 is temporarily stopped at the start of the desorption mode. Then, while the pump 13 is stopped, the desorption potential is applied between the working electrode and the counter electrode of the electrochemical cell to desorb carbon dioxide from the carbon dioxide adsorbent of the working electrode. On the other hand, during the execution period of the map creation process, the pump 13 is driven even in the desorption mode.

In step S170, the control device 17 determines whether or not the desorption mode execution time has elapsed. The desorption mode execution time is not constant but changes for the reasons: for optimizing the carbon dioxide recovery amount RVCO2 and consumed energy if the carbon dioxide adsorption performance of the electrochemical cell changes due to environmental changes or deterioration over time; and for others. This changing desorption mode execution time is set by the control device 17. In the step S170, it is determined whether the set recovery mode execution time has elapsed. The desorption mode execution time corresponds to desorption time or optimal desorption time. During the normal operation period, the optimal desorption time is adopted as the desorption mode execution time.

If it is determined in the determination processing in the step S170 that the set desorption mode execution time has elapsed, the process proceeds to a step S180. On the other hand, if it is determined that the set desorption mode execution time has not elapsed, the determination processing in the step S170 is repeatedly executed until the desorption mode execution time elapses. As described above, the control device 17 applies the desorption potential during the execution of the desorption mode in which carbon dioxide is desorbed, so that the carbon dioxide adsorbed by the carbon dioxide adsorbent is desorbed. The control device 17 applies the desorption potential only during the desorption mode execution time corresponding to the target carbon dioxide adsorption amount.

In the step S180, desorption mode end processing is executed. Specifically, the control device 17 stops the application of the desorption potential to the electrochemical cell while the channel on-off valve 11 is closed. Furthermore, the control device 17 also resets a count value of a counter that counts the desorption mode execution time, and the like.

In a step S190, the control device 17 starts the recovery mode that is the fourth operation mode of the series of control sequences. In this recovery mode, as shown in the normal operation period of FIG. 3, the channel on-off valve 11 and the channel switching valve 14 are put in the same state as in the desorption mode. Also, in the recovery mode, a desorption potential is applied to the electrochemical cell of the collector device 12 as in the desorption mode. However, in the recovery mode, the pump 13 is activated again. Thus, the control device 17 does not activate the pump 13 in the desorption mode, but activates the pump 13 in the recovery mode. Therefore, the control device 17 may be able to activate the pump 13 efficiently.

As described above, the channel on-off valve 11 is closed, so that the collector device 12 is in a sealed state on the upstream side of the pump 13. In addition, the channel switching valve 14 is controlled so that the downstream side pipe of the pump 13 is communicated with the CO2 recovery tank 16. If the pump 13 is activated in this state, the carbon dioxide remaining in a closed state of the collector device 12 is sucked out of the collector device 12 and recovered in the CO2 recovery tank 16. In order to perform a sucking operation of the carbon dioxide desorbed from the electrochemical cell in a state closer to a vacuum than the atmosphere, the pump 13 is continuously activated by an activation output equivalent to that in the scavenging mode.

In a step S200, the control device 17 determines whether or not the carbon dioxide recovery amount RVCO2 has reached the target recovery amount. In the recovery mode, as described above, the control of the channel on-off valve 11, the electrochemical cell of the collector device 12, the pump 13, and the channel switching valve 14 is performed. Therefore, in the recovery mode, as indicated by the dotted arrow in FIG. 4C, the carbon dioxide desorbed from the electrochemical cell is guided to the flow piping toward the CO2 recovery tank 16 via the channel switching valve 14 through the pump 13. The carbon dioxide is collected and accumulated in the CO2 recovery tank 16 via the flow piping.

At this time, the concentration and flow rate of the carbon dioxide flowing through the channel pipe toward the CO2 recovery tank 16 are detected by the sensor 15. Based on the detection results by the sensor 15, the control device 17 can calculate the recovery amount of the carbon dioxide recovered in the CO2 recovery tank 16 by executing the series of control sequences. The concentration of the carbon dioxide flowing through the channel pipe toward the CO2 recovery tank 16 is usually close to 100%. Therefore, a sensor 15 capable of detecting a flow rate of the carbon dioxide may be used. The target carbon dioxide adsorption amount TGCO2 or the like may be adopted as the target recovery amount.

In the determination process of the step S200, if it is determined that the carbon dioxide recovery amount RVCO2 has reached the target recovery amount, the process proceeds to a step S210. On the other hand, if it is determined that the carbon dioxide recovery amount RVCO2 has not reached the target recovery amount, the determination process of the step S200 is repeatedly executed until the carbon dioxide recovery amount RVCO2 reaches the target recovery amount.

In the step S210, recovery mode end processing is executed. Specifically, the control device 17 opens the channel on-off valve 11 to cause the collector device 12 to communicate with the outside. The control device 17 stops the application of the desorption potential to the electrochemical cell. The control device 17 stops the activation of the pump 13. The control device 17 switches the channel switching valve 14 to cause the pipe on the downstream side of the pump 13 to communicate with the outside.

Here, it can be considered that the carbon dioxide adsorption performance of the electrochemical cell changes due to deterioration over time or the like. However, an upper limit amount that the electrochemical cell can adsorb carbon dioxide cannot be directly detected. Therefore, it cannot be denied the possibility that the execution of the adsorption mode may be continued even though the carbon dioxide adsorption amount of the electrochemical cell reaches the upper limit, or the execution of the recovery mode may be continued even though the recovery of the carbon dioxide desorbed from the electrochemical cell is substantially finished.

As described above, for example, if the adsorption mode is always executed for a time sufficient to adsorb the upper limit amount of carbon dioxide that can be adsorbed by the electrochemical cell and the recovery mode is executed for a time sufficient to recover all the carbon dioxide adsorbed by the electrochemical cell in order to maximize the recovery amount of carbon dioxide, there is the possibility that, in the carbon dioxide recovery system 10, excessive energy may be consumed with respect to the recovery amount of carbon dioxide.

Therefore, the carbon dioxide recovery system 10 according to the present embodiment has a configuration in which the adsorption amount change map data and the recovery amount change map data are stored in the storage unit 18 of the control device 17.

Figure 8:
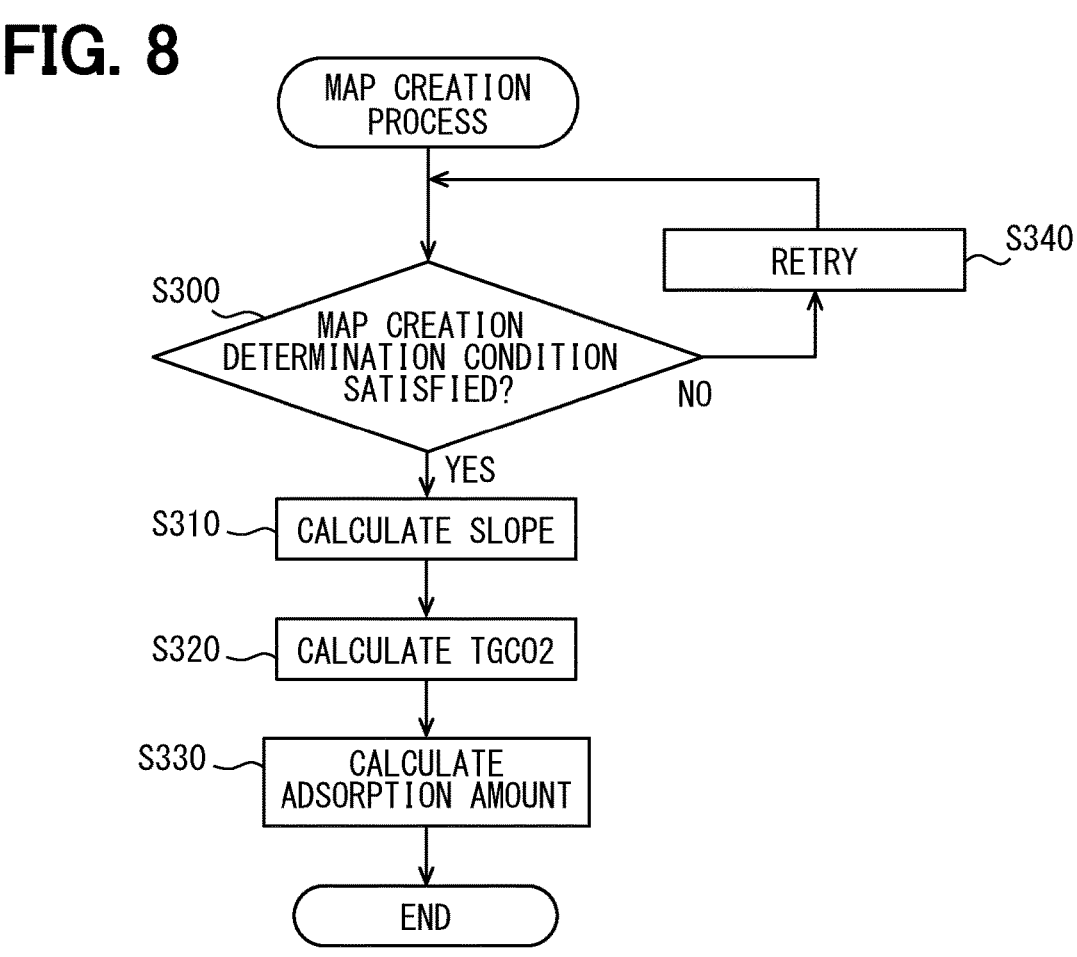
FIG. 8 is a flowchart showing map creation process for creating the adsorption amount change map data.

Hereinafter, the adsorption amount change map data and the recovery amount change map data will be described in detail. First, a map creation process of creating the adsorption amount change map data will be described based on the flowchart of FIG. 8.

If performing the map creation process, the control device 17 causes multiple times of the adsorption mode to be executed at different adsorption mode execution times (elapsed times), and detects, through the sensor 15, the carbon dioxide recovery amount RVCO2s in multiple times of the recovery mode executed corresponding to each adsorption mode. For example, FIG. 3 shows an example in which three times of the adsorption mode are executed at different periods of the adsorption mode execution time. The number of times of execution of the multiple times of the adsorption mode may be two.

In FIG. 3, a first time of the execution time of the adsorption mode is set to be relatively short such that the carbon dioxide adsorption amount of the electrochemical cell does not reach an upper limit value. Therefore, the carbon dioxide recovery amount RVCO2, detected when the recovery mode corresponding to the first time of execution of the adsorption mode is executed, is an amount less than the upper limit value of the carbon dioxide adsorption amount of the electrochemical cell.

A second time of the execution time of the adsorption mode is set to be relatively long such that the carbon dioxide adsorption amount of the electrochemical cell reaches substantially the upper limit value. Therefore, the carbon dioxide recovery amount RVCO2, detected when the recovery mode corresponding to the second time of execution of the adsorption mode is executed, is an amount substantially equal to the upper limit value of the carbon dioxide adsorption amount of the electrochemical cell.

A third time of the execution time of the adsorption mode is set to be the longest such that, even after the carbon dioxide adsorption amount of the electrochemical cell reaches the upper limit value, the adsorption mode is still executed for a certain period of time. Therefore, the carbon dioxide recovery amount RVCO2, detected when the recovery mode corresponding to the third time of execution of the adsorption mode is executed, is an amount equal to the upper limit value of the carbon dioxide adsorption amount of the electrochemical cell (RVCO2=the upper limit value).

A maximum adsorption amount of the electrochemical cell and a maximum adsorption amount time, which is an adsorption mode execution time to obtain the maximum adsorption amount, are estimated based on the sensor detection results during the execution of the multiple times of the adsorption mode and the multiple times of the recovery mode corresponding to each of the adsorption modes. A specific example of a method for estimating the maximum adsorption amount and the maximum adsorption amount time of the electrochemical cell is described with reference to graphs of FIG. 9A, FIG. 9B, and FIG. 9C.

In a step S300, it is determined whether a map creation determination condition is satisfied. The control device 17 determines whether the carbon dioxide recovery amount RVCO2 in the three times of the recovery mode can be plotted for one piece of the adsorption amount change map data, and whether there is a maximum value of the carbon dioxide recovery amount RVCO2 that is not plotted on the same straight line. The same straight line may include a tolerance. If the control device 17 determines that the map creation determination condition is satisfied, the process proceeds to a step S310. If the control device 17 determines that the map creation determination condition is not satisfied, the process proceeds to a step S340.

In the step S340, retry is performed. The control device 17 causes the adsorption mode to be executed again, and detects, through the sensor 15, the carbon dioxide recovery amount RVCO2 in the recovery mode executed corresponding to the adsorption mode. At this time, the control device 17 sets the execution time of the adsorption mode to be longer than the last time (third time).

Then, the control device 17 performs S300 by using the carbon dioxide recovery amount RVCO2 obtained in the retry. The control device 17 repeatedly executes steps S300 and S340 until a YES determination is made in the step S300. If the step S340 is executed, the control device 17 adopts, in a step S320, the carbon dioxide recovery amount RVCO2 at the time of the retry as the target carbon dioxide adsorption amount.

Figure 9A:
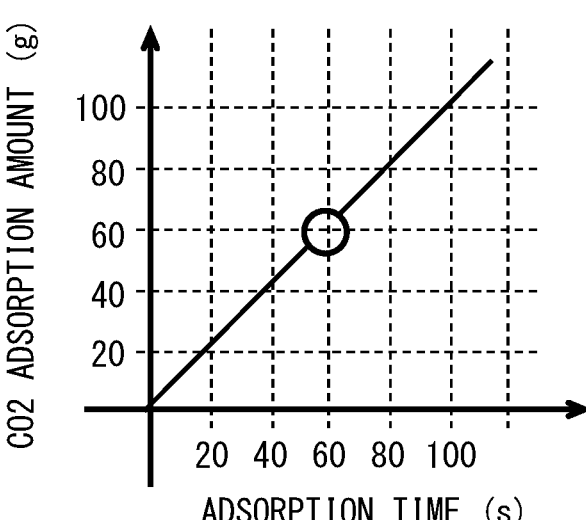
FIG. 9A is an explanatory diagram for explaining an example of a method for estimating a maximum adsorption amount and a maximum adsorption amount time of an electrochemical cell.

In the step S310, a slope is calculated. The graph in FIG. 9A shows the carbon dioxide adsorption amount of the electrochemical cell and the execution time of the first time of the adsorption mode, based on the carbon dioxide recovery amount RVCO2 detected when the recovery mode corresponding to the first time of the adsorption mode is executed. The carbon dioxide adsorption amount of the electrochemical cell can be regarded as equal to the detected carbon dioxide recovery amount RVCO2 (RVCO2=the carbon dioxide adsorption amount). As described above, the execution time of the first time of the adsorption mode is set to be relatively short such that the carbon dioxide adsorption amount of the electrochemical cell does not reach the upper limit value. Therefore, as shown in FIG. 9A, an increasing gradient line (slope) can be determined, by assuming that the carbon dioxide adsorption amount also linearly increases as the execution time of the adsorption mode becomes longer, based on the carbon dioxide adsorption amount of the electrochemical cell by executing the first time of the adsorption mode.

Figure 9B:
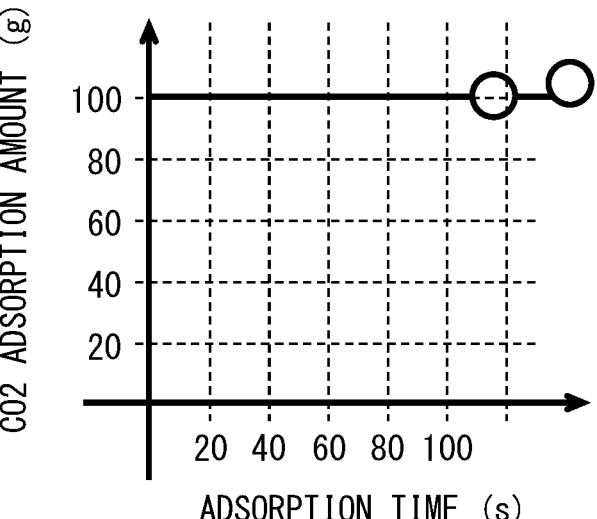
FIG. 9B is an explanatory diagram for explaining an example of a method for estimating a maximum adsorption amount and a maximum adsorption amount time of an electrochemical cell.

In the step S320, the target carbon dioxide adsorption amount TGCO2 is calculated. In FIG. 9B is a graph showing the carbon dioxide adsorption amount of each electrochemical cells and the execution time of the second time and the third time of the adsorption modes, based on the carbon dioxide recovery amount RVCO2 detected when the recovery mode corresponding to the second time and the third time of the adsorption modes is executed. As described above, the execution time of the second time of the adsorption mode is set to be relatively long such that the carbon dioxide adsorption amount of the electrochemical cell reaches substantially the upper limit value. The execution time of the third time of the adsorption mode is set to be the longest such that, even after the carbon dioxide adsorption amount of the electrochemical cell reaches the upper limit value, the adsorption mode is still executed for a certain period of time. Therefore, as shown in FIG. 9B, it is possible to determine an upper limit line of the carbon dioxide adsorption amount of the electrochemical cell based on the carbon dioxide adsorption amount of the electrochemical cell adsorbed in executions of the second time and the third time of the adsorption mode. The carbon dioxide adsorption amount corresponding to the upper limit line is the target carbon dioxide adsorption amount that is the maximum adsorption amount that can be adsorbed.

The upper limit line of the carbon dioxide adsorption amount of the electrochemical cell may be determined based on the carbon dioxide adsorption amount of the electrochemical cell that can be obtained through the execution of one time of the adsorption mode and the recovery mode corresponding to the one time of the adsorption mode.

Figure 9C:
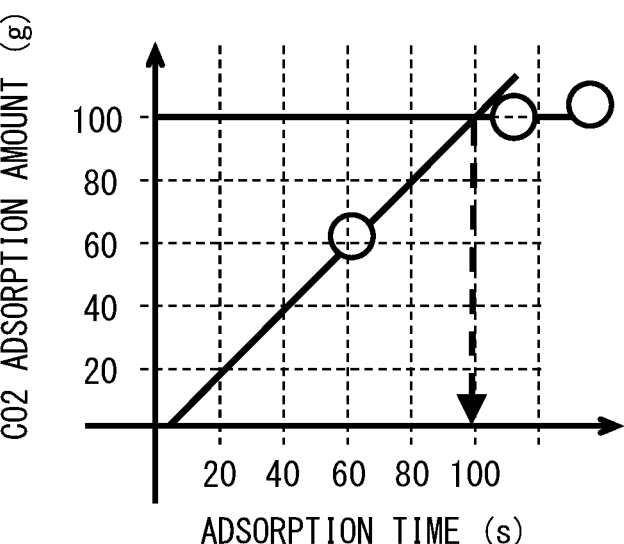
FIG. 9C is an explanatory diagram for explaining an example of a method for estimating a maximum adsorption amount and a maximum adsorption amount time of an electrochemical cell.

In a step S330, as shown in the graph of FIG. 9C, it is possible to determine the adsorption time, which is the maximum adsorption amount time that is the adsorption mode execution time to obtain the maximum adsorption amount, based on the intersection between the increasing gradient line in FIG. 9A and the upper limit line in FIG. 9B.

As described above, the control device 17 estimates, based on the carbon dioxide recovery amount RVCO2 that are the detection results in the multiple times of the recovery mode, the maximum adsorption amount of the electrochemical cell as the target carbon dioxide adsorption amount TGCO2, and creates the adsorption amount change data by estimating the adsorption time to obtain the maximum adsorption amount. Then, the control device 17 stores the created adsorption amount change map data in the storage unit 18. In the adsorption amount change map data, the target carbon dioxide adsorption amount and the adsorption time are updated due to deterioration over time or the like of the electrochemical cell.

Figures 10, 11:
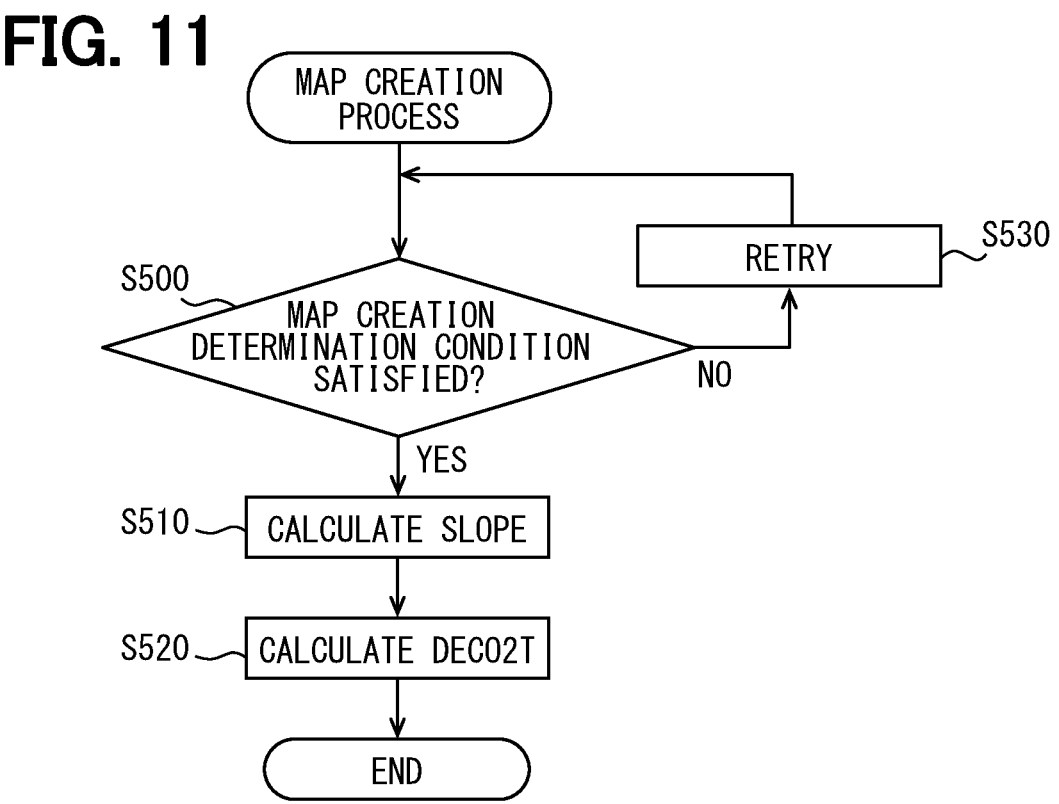
FIG. 10 is a flowchart showing a setting process for a target carbon dioxide adsorption amount TGCO2.
FIG. 11 is a flowchart showing map creation process for creating the desorption amount change map data.

Next, a setting process for the target carbon dioxide adsorption amount TGCO2 in the recovery amount change map data will be described based on the flowchart of FIG. 10. The control device 17 executes the flowchart of FIG. 10 to determine whether the target carbon dioxide adsorption amount TGCO2 is maintained to the current value or updated.

In the recovery amount change map data, a different value of the target carbon dioxide adsorption amount TGCO2 is associated every number of cycles of multiple times of the control sequences, as shown in FIGS. 6 and 7. Here, an example is adopted in which the target carbon dioxide adsorption amount is updated every 10 cycles. In the recovery amount change map data, the carbon dioxide recovery amount RVCO2 (carbon dioxide monitor value) detected through the sensor 15 is associated with the target carbon dioxide adsorption amount.

The initial calculated threshold value is an initial target carbon dioxide adsorption amount adopted from the first cycle to the tenth cycle. The updated threshold value is an updated target carbon dioxide adsorption amount. The updated threshold value is a target carbon dioxide adsorption amount assumed due to deterioration over time or the like of the electrochemical cell. Therefore, the updated threshold value is a value smaller than the initial calculated threshold value. In addition, the updated threshold value becomes a smaller value as the number of the cycles increases.

In addition, adsorption amount holding regions ADHRG are between the initial calculated threshold value and the updated threshold value and between the updated threshold value and the next updated threshold value. The adsorption amount holding region ADHRG is a region where the current target carbon dioxide adsorption amount is held. On the other hand, a region out of the adsorption amount holding region ADHRG is an adsorption amount update region ADURG. The adsorption amount update region ADURG is a region where the target carbon dioxide adsorption amount is updated from the current value.

In a step S400, it is determined whether the recovery amount is within the adsorption amount holding region ADHRG. The control device 17 determines whether the carbon dioxide monitor value as the recovery amount is within the adsorption amount holding region ADHRG. If the control device 17 determines that the carbon dioxide monitor value is within the adsorption amount holding region ADHRG, the process proceeds to a step S410. If the control device 17 determines that the carbon dioxide monitor value is not within the adsorption amount holding region ADHRG, the process proceeds to a step S420.

In the step S310, the target carbon dioxide adsorption amount TGCO2 is held. The control device 17 holds the current target carbon dioxide adsorption amount TGCO2. In the case of the carbon dioxide monitor value indicated by dot hatchings in FIG. 7, the control device 17 holds the current values of the target carbon dioxide adsorption amount TGCO2.

In a step S420, the target carbon dioxide adsorption amount is updated. The control device 17 updates the current target carbon dioxide adsorption amount to a new target carbon dioxide adsorption amount. In the case of the carbon dioxide monitor value indicated by a diagonal hatching in FIG. 7, the control device 17 updates the target carbon dioxide adsorption amount.

In a step S430, the target carbon dioxide adsorption amount TGCO2 is set. The control device 17 sets the current target carbon dioxide adsorption amount or the updated target carbon dioxide adsorption amount as the target carbon dioxide adsorption amount if the adsorption mode execution time is set. As described above, the control device 17 sets the target carbon dioxide adsorption amount TGCO2 from the carbon dioxide recovery amount RVCO2.

As described above, the carbon dioxide recovery system 10 includes the control device 17 that detects, through the sensor 15, the recovery amount of the carbon dioxide recovered from the collector device 12 to the CO2 recovery tank 16. Then, the control device 17 acquires, as the target carbon dioxide adsorption amount TGCO2, a correlation value correlated with the carbon dioxide recovery amount RVCO2 as a detection result through the sensor 15. Therefore, the carbon dioxide recovery system 10 may observe the target carbon dioxide adsorption amount TGCO2.

In addition, the control device 17 makes to execute multiple times of the adsorption mode, and observes the target carbon dioxide adsorption amount using the adsorption amount change map data created by using the carbon dioxide recovery amount RVCO2 detected through the sensor 15 in multiple times of the recovery mode executed corresponding to each one of the adsorption modes. Then, the control device 17 applies the adsorption potential only during the adsorption mode execution time obtained from the adsorption amount change map data. Therefore, the control device 17 may apply the adsorption potential only for a time required to obtain the maximum adsorption amount. In other words, the control device 17 may suppress application of the adsorption potential for a time longer than the time required to obtain the maximum adsorption amount. Therefore, the control device 17 may appropriately control the application time of the adsorption potential to obtain the maximum adsorption amount.

Since the control device 17 updates the adsorption amount change map data according to the carbon dioxide recovery amount RVCO2 detected through the sensor 15, it is possible to observe the optimum target carbon dioxide adsorption amount and appropriately control the application time of the adsorption potential even if the electrochemical cell deteriorates over time.

The desorption amount change map data is described in detail below. First, a map creation process of creating the adsorption amount change map data is described based on the flowchart of FIG. 11. The control device 17 creates desorption amount change map data during the execution period of the map creating process of FIG. 3. The control device 17 executes at least the recovery mode to generate desorption amount change map data.

In a step S500, it is determined whether a map creation determination condition is satisfied. The map creation determination condition here is a determination condition for creating desorption amount change map data, and is different from the map creation determination condition in the step S300. The map creation determination condition here may also be said to be a desorption amount determination condition.

The control device 17 determines that the map creation determination condition is satisfied if the carbon dioxide recovery amount RVCO2 is larger than an estimated desorption amount ESDS (RVCO2>ESDS). The carbon dioxide recovery amount RVCO2 is a final value of the carbon dioxide recovery amount RVCO2 detected via the sensor 15. As indicated by hatchings in FIGS. 17 and 18, the carbon dioxide recovery amount RVCO2 may include tolerance.

Figure 16:
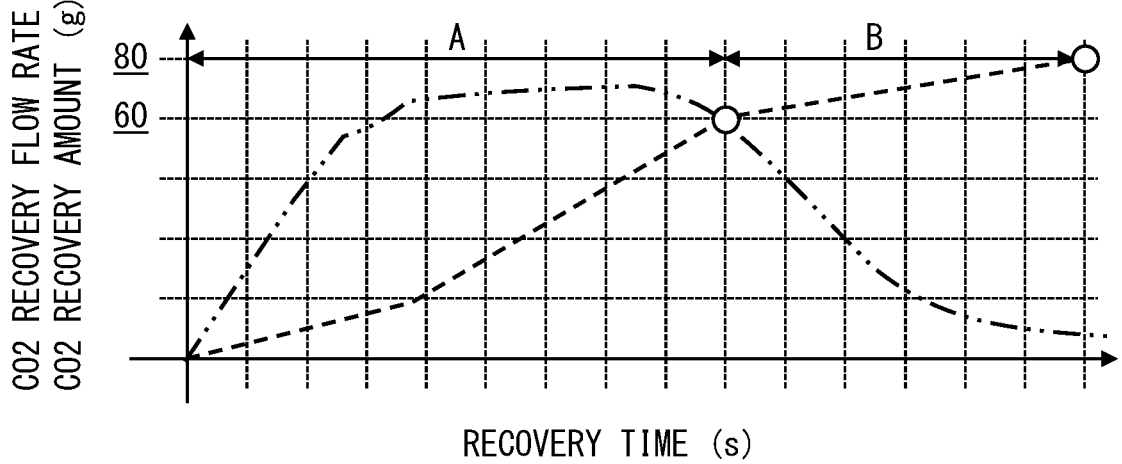
FIG. 16 is a diagram showing setting of carbon dioxide recovery amount.

The estimated desorption amount ESDS is the carbon dioxide desorption amount estimated from the relationship shown in FIG. 16. FIG. 16 is an image diagram showing a relationship between an activation time (recovery time) of the pump 13 and a recovery state of carbon dioxide. In FIG. 16, the carbon dioxide recovery flow rate is indicated by a two-dot chain line, and the carbon dioxide recovery amount RVCO2 is indicated by a dotted line. The carbon dioxide recovery amount RVCO2 (monitor value) in a period "A" is the carbon dioxide recovery amount RVCO2 recovered during the provisional desorption time described later. The carbon dioxide recovery amount RVCO2 recovered in the period "A" may be regarded as an amount of the carbon dioxide desorbed before executing the recovery mode. That is, the control device 17 acquires the carbon dioxide recovery amount RVCO2 recovered during the provisional desorption time set so as to achieve the target carbon dioxide desorption amount in the period "A" by activating the pump 13 in the recovery mode.

The carbon dioxide recovery amount RVCO2 (monitor value) in a period "B" is the carbon dioxide recovery amount recovered after the provisional desorption time has elapsed. The carbon dioxide recovery amount RVCO2 recovered in the period "B" may be regarded as an amount of the carbon dioxide desorbed during executing the recovery mode. During this period "B", it is considered that various factors such as the carbon dioxide desorption amount and an influence of a suction position affect the carbon dioxide recovery amount RVCO2. Therefore, here, the carbon dioxide recovery amount RVCO2 in the period "A" is adopted as an estimated desorption amount ESDS.

Figure 17:
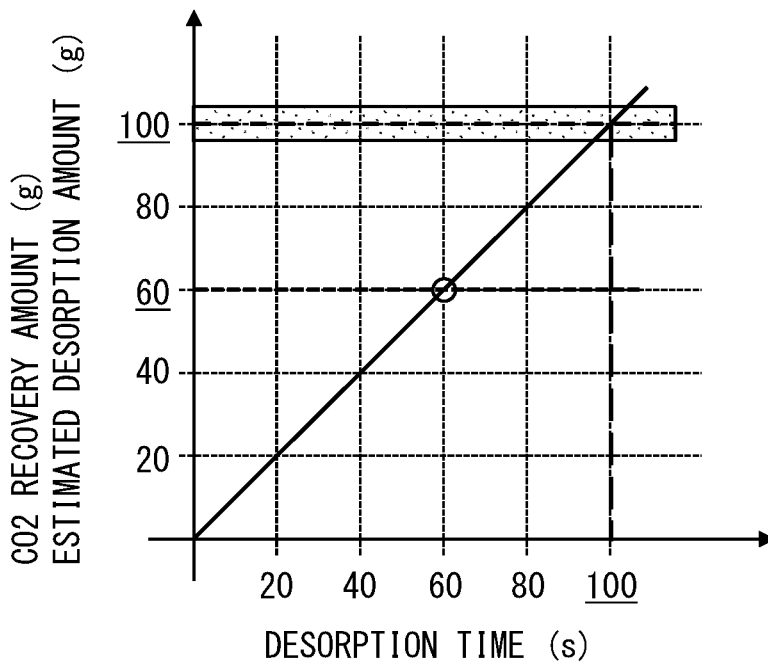
FIG. 17 is a diagram showing a case where a map creation determination condition is satisfied.
Figure 18:
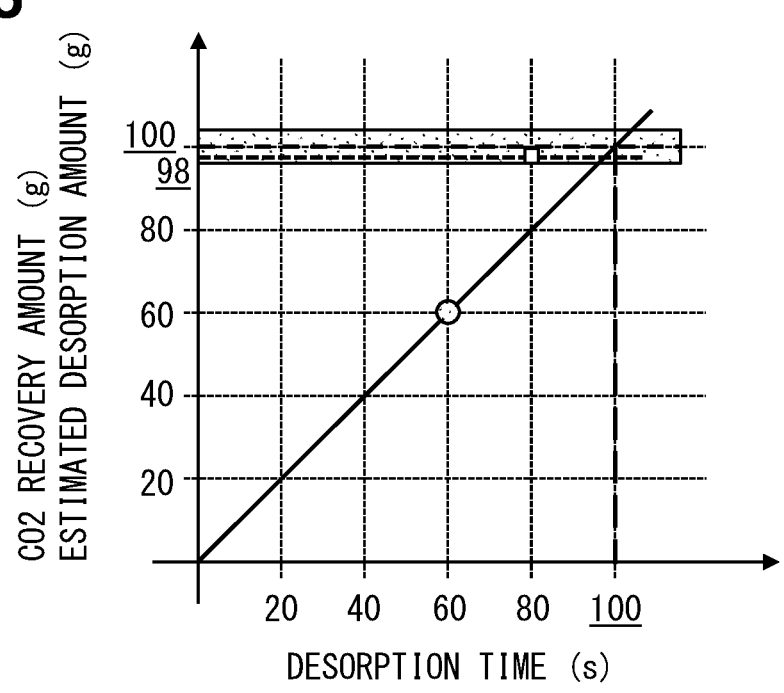
FIG. 18 is a diagram showing a case where a map creation determination condition is not satisfied.

In FIGS. 17 and 18, the carbon dioxide recovery amount RVCO2 is 100 [g]. In addition, FIG. 17 shows the case where the monitor value is the estimated desorption amount of 60 [g], as indicated by a circle symbol. On the other hand, FIG. 18 shows the case where the monitor value is an estimated desorption amount of 98 [g] as indicated by a square symbol. Also, FIG. 18 shows the case where the monitor value at the time of a retry is an estimated desorption amount of 60 [g] as indicated by a hatched circle symbol. Note that the values in FIGS. 16, 17, and 18 are only examples, and this disclosure is not limited to these.

In the example of FIG. 17, the carbon dioxide recovery amount RVCO2 is larger than the estimated desorption amount ESDS (RVCO2>ESDS), and thus the map creation determination condition is satisfied. Therefore, the control device 17 proceeds to a step S510. In the example of FIG. 18, the carbon dioxide recovery amount RVCO2 is not larger than the estimated desorption amount ESDS, so the map creation determination condition is not satisfied. Therefore, the control device 17 proceeds to a step S530. In the step S530, retry process is performed. The control device 17 again performs the operation of confirming the estimated desorption amount in the map creation process. In this embodiment, retry is performed at least once.

Note that the estimated desorption amount may be calculated based on the monitor values for a plurality of times. In this case, any one of the average value, the maximum value, and the minimum value of the plurality of monitor values may be used as the estimated desorption amount.

Figures 12, 13:
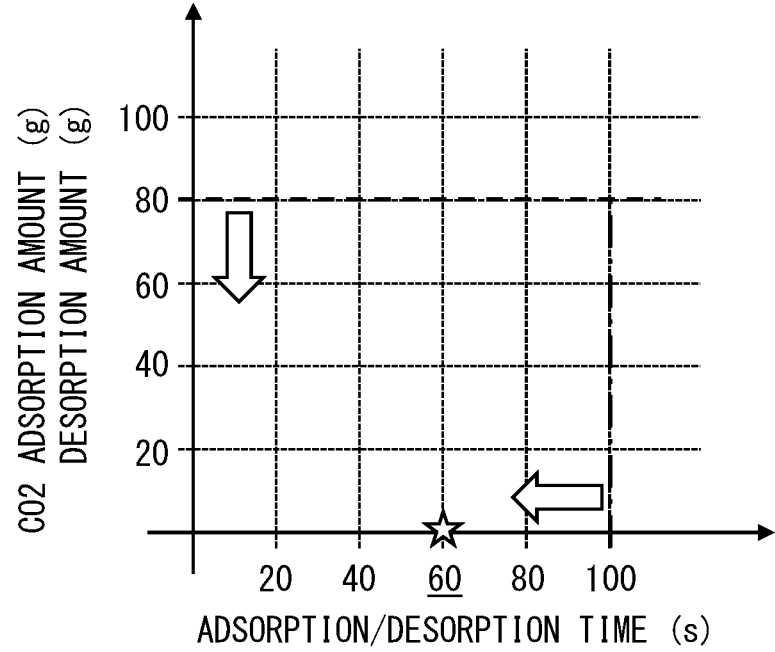
FIG. 12 is a flowchart showing desorption time update processing.
FIG. 13 is a diagram showing setting of a provisional desorption time.

In the step S510, a slope is calculated. First, as shown in FIG. 13, the provisional desorption time is set. The control device 17 sets the provisional desorption time so that the target carbon dioxide desorption amount is achieved. The control device 17 calculates the provisional desorption time from the theoretical value. The control device 17 calculates the provisional desorption time at which the carbon dioxide adsorption amount becomes larger than the carbon dioxide desorption amount. In addition, the control device 17 sets to satisfy a condition (the adsorption mode execution time>the provisional desorption time) based on the adsorption mode execution time and the carbon dioxide adsorption amount. Here, 60 [s] is adopted as the provisional desorption time.

The control device 17 activates the pump 13 in the recovery mode to acquire the carbon dioxide recovery amount RVCO2 during a set time of the provisional desorption time. By the way, it is preferable that a target of the carbon dioxide desorption amount corresponds to an amount of carbon dioxide desorbed before execution of the recovery mode. That is, the target carbon dioxide desorption amount is preferably the same amount as the carbon dioxide recovery amount RVCO2 in the period "A". As a result, it is possible to acquire the carbon dioxide recovery amount that is not affected by various factors such as the carbon dioxide desorption amount and the suction position. That is, the control device 17 activates the pump 13 in the recovery mode to obtain the carbon dioxide recovery amount RVCO2 during the period "A".

Figure 14:
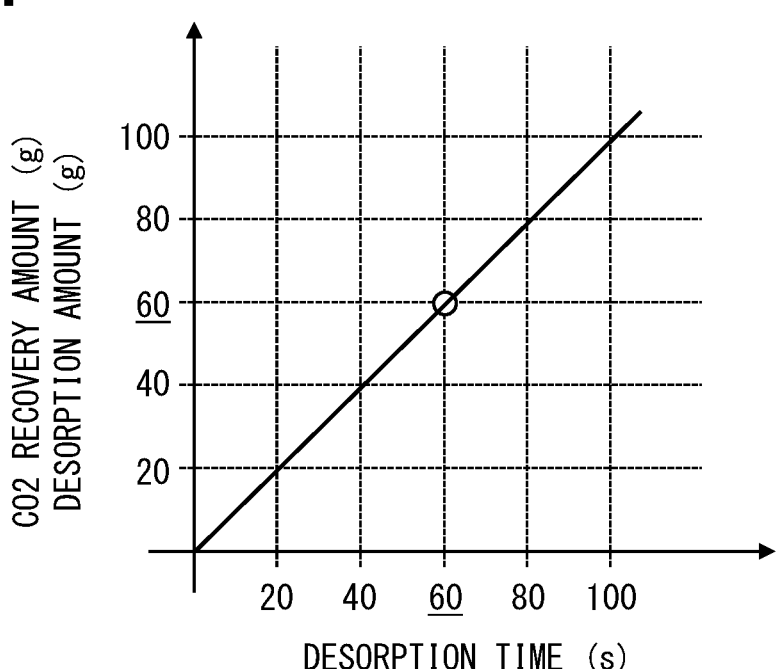
FIG. 14 is a diagram showing setting of an increasing slope line.

By the way, it may be assumed that the carbon dioxide desorption amount increases as the desorption time increases. Therefore, the control device 17 can define an increasing gradient line (slope) including a relationship between the carbon dioxide desorption amount corresponding to the carbon dioxide recovery amount RVCO2 recovered in the period "A" and the provisional desorption time. That is, the control device 17 creates desorption amount change map data in which the carbon dioxide desorption amount and the desorption time are associated. An acquired value of the recovery amount is assumed as the desorption amount. The desorption amount change map data is created to satisfy a relationship between an increase of the carbon dioxide desorption amount and a lapse of the desorption time. This relationship between an increase of the carbon dioxide desorption amount and a lapse of the desorption time includes a relationship between the provisional desorption time and the carbon dioxide desorption amount corresponding to the carbon dioxide recovery amount RVCO2. The increasing gradient line is a proportional straight line that passes through the desorption time of 0 [s]

and the circle symbol in FIG. 14. In addition, if the desorption time is 0 [s], the carbon dioxide recovery amount RVCO2 is 0 [g].

In a step S520, the carbon dioxide desorption time DECO2T is calculated. As shown in FIG. 15, the control device 17 uses the desorption amount change map data to calculate (acquire) the carbon dioxide desorption time DECO2T from the carbon dioxide recovery amount RVCO2, which is the monitor value. In other words, the control device 17 can determine the carbon dioxide desorption time DECO2T from the intersection of the carbon dioxide desorption amount equivalent to the carbon dioxide recovery amount RVCO2, which is the monitored value, and the increasing gradient line. This carbon dioxide desorption time DECO2T is the optimum desorption time for obtaining a carbon dioxide desorption amount equivalent to the carbon dioxide recovery amount RVCO2, which is a monitored value.

Specifically, the control device 17 acquires the optimum desorption time which is the desorption time associated with the carbon dioxide desorption amount equivalent to the carbon dioxide recovery amount RVCO2, which is the monitor value, in a desorption amount change map data. In the example of FIG. 15, 80 [g] is adopted as an example for the carbon dioxide recovery amount RVCO2 (the carbon dioxide desorption amount), which is a monitor value. Therefore, the control device 17 acquires 80 [s] as the carbon dioxide desorption time DECO2T from the intersection of the carbon dioxide recovery amount RVCO2 of 80 [g] and the increasing gradient line.

Then, the control device 17 uses the carbon dioxide desorption time DECO2T (optimal desorption time) acquired here in the desorption mode during the normal operation period. That is, the control device 17 applies the desorption potential only during the optimum desorption time as the desorption mode execution time in the desorption mode during the normal operation period.

Note that, the present disclosure may determine the carbon dioxide desorption time DECO2T by using the target carbon dioxide adsorption amount TGCO2 instead of the carbon dioxide recovery amount RVCO2, which is the monitor value.

Next, the desorption time update process is described based on the flowchart of FIG. 12. As described above, the carbon dioxide recovery system 10 employs an example in which the target carbon dioxide adsorption amount TGCO2 is updated for each one of the predetermined cycles. Therefore, the control device 17 starts the flowchart of FIG. 12, if the target carbon dioxide adsorption amount TGCO2 is updated. In a step S600, the carbon dioxide desorption time DECO2T is calculated as described above. Then, in a step S610, the calculated carbon dioxide desorption time DECO2T is fixed as the carbon dioxide desorption time DECO2T to be used in the next cycle. That is, the control device 17 updates the target carbon dioxide adsorption amount TGCO2 to a smaller value every predetermined period, and updates the optimal desorption time to a shorter value along with the update of the target carbon dioxide adsorption amount TGCO2.

As described above, in the carbon dioxide recovery system 10, the carbon dioxide recovery amount RVCO2, the carbon dioxide adsorption amount, and the carbon dioxide desorption amount can be considered equivalent. Therefore, the carbon dioxide recovery system 10 acquires, as described above, the carbon dioxide desorption time DECO2T as the optimal desorption time. The carbon dioxide desorption time is associated with the desorption amount equivalent to the carbon dioxide recovery amount RVCO2 or the target carbon dioxide adsorption amount in the desorption amount change map data. Then, the carbon dioxide recovery system applies the second potential only during the optimum desorption time in the desorption mode. Therefore, in the carbon dioxide recovery system, it is possible to suppress energy consumption by optimizing a apply time of the second potential in the desorption mode.

In the carbon dioxide recovery system 10, the optimum desorption time is obtained using desorption amount change map data created by executing a series of control sequences. Therefore, in the carbon dioxide recovery system 10, a time for applying the desorption potential can be optimized according to the states of the electrochemical cell, the pump 13, and the like.

The carbon dioxide recovery system 10 stops an application of the desorption potential and activates the pump 13, if an elapsed time from a start of the application of the desorption potential reaches the optimal desorption time. Then, the carbon dioxide recovery system 10 stops the pump 13 if the carbon dioxide recovery amount RVCO2 reaches the target recovery amount. This allows the carbon dioxide recovery system 10 to minimize an activation time period of the pump 13. Therefore, the carbon dioxide recovery system 10 may minimize the energy required to activate the pump 13.

Furthermore, the carbon dioxide recovery system 10 updates the carbon dioxide desorption time DECO2T as the optimum desorption time if the target carbon dioxide adsorption amount TGCO2 is updated. As a result, the carbon dioxide recovery system 10 may set the optimum desorption time in accordance with the carbon dioxide recovery amount RVCO2 and the carbon dioxide adsorption amount that change due to aging deterioration of the electrochemical cell. Therefore, the carbon dioxide recovery system 10 can reduce energy consumption in the desorption mode even if the electrochemical cell deteriorates over time.

Although the preferred embodiments of the present disclosure have been described above, the present disclosure is not limited to the above embodiments at all, and various modifications can be made without departing from the gist of the present disclosure. For example, the configuration of the above embodiment may be modified as follows.

(Modifications)

The adsorption mode execution time is not limited to that obtained from the adsorption amount change map data. The adsorption mode execution time can also be obtained by calculating a predetermined relational expression. The control device 17 may obtain the adsorption mode execution time by multiplying the carbon dioxide recovery amount RVCO2 [g] detected through the sensor 15 by a carbon dioxide adsorption coefficient [s/g].

The carbon dioxide adsorption coefficient is a coefficient indicated by a time required for the carbon dioxide adsorbent to adsorb a predetermined amount of carbon dioxide. That is, the carbon dioxide adsorption coefficient is defined as a time required to adsorb 1 [g] of carbon dioxide. The carbon dioxide adsorption coefficient [s/g] is a value of an adsorption time [s]/a carbon dioxide adsorption amount [g]. The first modification can achieve the same effects as those of the above embodiment.

Although the present disclosure has been described in accordance with the embodiments, it is understood that the present disclosure is not limited to such embodiments or structures. The present disclosure encompasses various modifications and variations within the scope of equivalents. In addition, while the various elements are shown in various combinations and configurations, which are exemplary, other combinations and configurations, including more, less or only a single element, are also within the spirit and scope of the present disclosure.

Disclosed Technical Idea

This specification discloses a plurality of technical ideas described in a plurality of items listed below, and discloses a multiple combination technical ideas shown by alternatively citing the preceding technical ideas in subsequent technical ideas.

Technical Idea 1, A carbon dioxide recovery system which recovers carbon dioxide from a mixed gas containing carbon dioxide by an electrochemical reaction, the system comprising: a carbon dioxide recovery tank (16) which stores recovered carbon dioxide; at least one collector device (12) which has an electrochemical cell and a container, the electrochemical cell having a working electrode containing an adsorbent capable of adsorbing carbon dioxide and a counter electrode paired with the working electrode, the container containing the electrochemical cell and being supplied with a mixed gas; a sensor (15) which detects a recovery amount of carbon dioxide recovered from the collector device to the carbon dioxide recovery tank; a control device (17) which is configured to acquire a correlation value correlated with a recovery amount, which is a detection result through the sensor, and control (i) an application of a first potential between the working electrode and the counter electrode only during an adsorption time corresponding to a target adsorption amount which is an adsorption amount of carbon dioxide that the adsorbent can adsorb so that the adsorbent adsorbs carbon dioxide when executing an adsorption mode in which carbon dioxide is adsorbed, or (ii) an application of a second potential between the working electrode and the counter electrode only during a recovery time corresponding to the recovery amount when executing a desorption mode in which the carbon dioxide adsorbed in the adsorbent is desorbed; and a storage unit (18) which stores desorption amount change data in which a desorption amount of carbon dioxide and a desorption time for obtaining the desorption amount are associated, wherein the control device is configured to acquire a desorption time, as an optimum desorption time, associated with a desorption amount equivalent to a recovery amount or a target adsorption amount in the desorption amount change data, and apply a second potential only during the optimum desorption time in a desorption mode.

Technical Idea 2, The carbon dioxide recovery system according to technical idea 1, wherein the control device is configured to perform a recovery mode which recovers the carbon dioxide desorbed from the collector device to the carbon dioxide recovery tank by starting a driving of the pump, if the optimum desorption time elapses through the application of the second potential, and stop the driving of the pump, if the recovery amount reaches a target recovery amount.

Technical Idea 3, The carbon dioxide recovery system according to technical idea 1 or 2, wherein the control device is configured to perform the recovery mode to create the desorption amount change data, acquire the recovery amount of carbon dioxide recovered during a provisional desorption time, which is set to achieve the target desorption amount, by driving the pump in the recovery mode, and create the desorption amount change data, in which the desorption amount and the desorption time are associated, so as to satisfy a relationship between an increase of the desorption amount and a lapse of the desorption time, including a relationship between the provisional desorption time and the desorption amount, assuming an acquired value of the recovery amount as the desorption amount.

Technical Idea 4, The carbon dioxide recovery system according to technical idea 3, wherein a target of the desorption amount corresponds to an amount of carbon dioxide desorbed before execution of the recovery mode.

Technical Idea 5, The carbon dioxide recovery system according to any one of technical ideas 1-4, wherein the control device is configured to update the target adsorption amount to a smaller value every predetermined period, and update the optimum desorption time to a shorter value as the target adsorption amount is updated.

What is claimed is:

1. A carbon dioxide recovery system which recovers carbon dioxide from a mixed gas containing carbon dioxide by an electrochemical reaction, the system comprising:

a carbon dioxide recovery tank which stores recovered carbon dioxide;

at least one collector device which has an electrochemical cell and a container, the electrochemical cell having a working electrode containing an adsorbent capable of adsorbing carbon dioxide and a counter electrode paired with the working electrode, the container containing the electrochemical cell and being supplied with a mixed gas;

a sensor which detects an amount of carbon dioxide recovered from the collector device to the carbon dioxide recovery tank;

a control device which is configured to acquire a correlation value correlated with a recovery amount, which is a detection result through the sensor, and control (i) an application of a first potential between the working electrode and the counter electrode only during an adsorption time corresponding to a target adsorption amount which is an adsorption amount of carbon dioxide that the adsorbent can adsorb so that the adsorbent adsorbs carbon dioxide when executing an adsorption mode in which carbon dioxide is adsorbed, or (ii) an application of a second potential between the working electrode and the counter electrode only during a recovery time corresponding to the recovery amount when executing a desorption mode in which the carbon dioxide adsorbed in the adsorbent is desorbed; and a storage unit which stores desorption amount change data in which a desorption amount of carbon dioxide and a desorption time for obtaining the desorption amount are associated, wherein the control device is configured to:

acquire a desorption time, as an optimum desorption time, associated with a desorption amount equivalent to a recovery amount or a target adsorption amount in the desorption amount change data;

apply a second potential only during the optimum desorption time in a desorption mode;

perform a map creation process which creates the desorption amount change data during a map creation process execution period, and a normal operation which uses the optimal desorption time acquired from the desorption amount change data during a normal operation period, and the map creation process execution period is performed prior to the normal operation period to optimize a time for applying the second potential according to states of the electrochemical cell.

2. The carbon dioxide recovery system according to claim 1, wherein the control device is configured to:

perform a recovery mode which recovers the carbon dioxide desorbed from the collector device to the carbon dioxide recovery tank by starting a driving of a pump, if the optimum desorption time elapses through the application of the second potential; and stop the driving of the pump, if the recovery amount reaches a target recovery amount.

3. The carbon dioxide recovery system according to claim 2, wherein the control device is configured to:

perform the recovery mode to create the desorption amount change data;

acquire the recovery amount of carbon dioxide recovered during a provisional desorption time, which is set to achieve a target desorption amount, by driving the pump in the recovery mode; and create the desorption amount change data, in which the desorption amount and the desorption time are associated, so as to satisfy a relationship between an increase of the desorption amount and a lapse of the desorption time, including a relationship between the provisional desorption time and the desorption amount, assuming an acquired value of the recovery amount as the desorption amount.

4. The carbon dioxide recovery system according to claim 3, wherein a target of the desorption amount corresponds to an amount of carbon dioxide desorbed before execution of the recovery mode.

5. The carbon dioxide recovery system according to claim 3, wherein the control device is configured to:

update the target adsorption amount to a smaller value every predetermined period; and update the optimum desorption time to a shorter value as the target adsorption amount is updated.

6. The carbon dioxide recovery system according to claim 1, wherein the control device is configured to:

repeat the map creation process after the normal operation period.

7. The carbon dioxide recovery system according to claim 6, wherein the optimum desorption time corresponds to a time at which an incremental increase of the desorption amount per unit time becomes smaller than a predetermined value.

* * * * *